United States Patent
Beard et al.

(10) Patent No.: US 10,534,719 B2
(45) Date of Patent: *Jan. 14, 2020

(54) MEMORY SYSTEM FOR A DATA PROCESSING NETWORK

(71) Applicant: Arm Limited, Cambridge (GB)

(72) Inventors: Jonathan Curtis Beard, Austin, TX (US); Roxana Rusitoru, Cambridge (GB); Curtis Glenn Dunham, Austin, TX (US)

(73) Assignee: Arm Limited, Cambridge (GB)

( * ) Notice: Subject to any disclaimer, the term of this patent is extended or adjusted under 35 U.S.C. 154(b) by 106 days.

This patent is subject to a terminal disclaimer.

(21) Appl. No.: 15/819,328

(22) Filed: Nov. 21, 2017

(65) Prior Publication Data

US 2019/0018785 A1    Jan. 17, 2019

Related U.S. Application Data

(63) Continuation-in-part of application No. 15/650,008, filed on Jul. 14, 2017.

(51) Int. Cl.
*G06F 12/1009* (2016.01)
*G06F 12/0802* (2016.01)
(Continued)

(52) U.S. Cl.
CPC ...... *G06F 12/1009* (2013.01); *G06F 12/0653* (2013.01); *G06F 12/0802* (2013.01);
(Continued)

(58) Field of Classification Search
CPC .............. G06F 3/00; G06F 3/06–0689; G06F 5/00–16; G06F 9/00–548;
(Continued)

(56) References Cited

U.S. PATENT DOCUMENTS 4,347,565 A    8/1982  Kaneda et al.
4,792,897 A *  12/1988 Gotou ................. G06F 12/1009
                                                              711/207
(Continued)

FOREIGN PATENT DOCUMENTS

EP    3 128 415        2/2017
WO    WO 2016/160220   10/2016
WO    WO 2016/162817   10/2016
WO    WO 2016/204913   12/2016

OTHER PUBLICATIONS

Bang, Kwanhu & Park, Sang-Hoon & Jun, Minje & Chung, Eui-Young. (2011). A memory hierarchy-aware metadata management technique for Solid State Disks. Midwest Symposium on Circuits and Systems. 1-4.

(Continued)

*Primary Examiner* — Daniel C. Chappell
(74) *Attorney, Agent, or Firm* — Leveque IP Law, P.C.

(57) ABSTRACT

A data processing network includes a network of devices addressable via a system address space, the network including a computing device configured to execute an application in a virtual address space. A virtual-to-system address translation circuit is configured to translate a virtual address to a system address. A memory node controller has a first interface to a data resource addressable via a physical address space, a second interface to the computing device, and a system-to-physical address translation circuit, configured to translate a system address in the system address space to a corresponding physical address in the physical address space of the data resource. The virtual-to-system mapping may be a range table buffer configured to retrieve a range table entry comprising an offset address of a range together with a virtual address base and an indicator of the extent of the range.

21 Claims, 14 Drawing Sheets

(51) Int. Cl.
| | |
|---|---|
| *G06F 12/06* | (2006.01) |
| *G06F 12/0862* | (2016.01) |
| *G06F 12/1045* | (2016.01) |
| *G06F 12/1072* | (2016.01) |
| *G06F 12/1081* | (2016.01) |
| *G06F 12/109* | (2016.01) |
| *G06F 12/1036* | (2016.01) |

(52) U.S. Cl.
CPC ........ *G06F 12/0862* (2013.01); *G06F 12/109* (2013.01); *G06F 12/1063* (2013.01); *G06F 12/1072* (2013.01); *G06F 12/1081* (2013.01); *G06F 12/1036* (2013.01); *G06F 2212/1044* (2013.01); *G06F 2212/152* (2013.01); *G06F 2212/154* (2013.01); *G06F 2212/60* (2013.01); *G06F 2212/6024* (2013.01); *G06F 2212/62* (2013.01); *G06F 2212/651* (2013.01); *G06F 2212/657* (2013.01)

(58) Field of Classification Search
CPC ..... G06F 11/00–3696; G06F 12/00–16; G06F 13/00–429; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153

See application file for complete search history.

(56) References Cited

U.S. PATENT DOCUMENTS

| | | | |
|---|---|---|---|
| 5,361,337 A | 11/1994 | Okin | |
| 5,426,750 A * | 6/1995 | Becker | G06F 12/1027 711/207 |
| 5,577,231 A | 11/1996 | Scalzi et al. | |
| 5,752,275 A | 5/1998 | Hammond | |
| 5,867,649 A | 2/1999 | Larson | |
| 6,021,476 A | 2/2000 | Segars | |
| 6,345,241 B1 | 2/2002 | Brice | |
| 6,349,355 B1 | 2/2002 | Draves et al. | |
| 6,633,963 B1 | 10/2003 | Ellison et al. | |
| 6,704,873 B1 | 3/2004 | Underwood | |
| 6,715,145 B1 | 3/2004 | Bowman-Amuah | |
| 6,731,288 B2 | 5/2004 | Parsons | |
| 6,789,156 B1 | 9/2004 | Waldspurger | |
| 6,822,959 B2 | 11/2004 | Galbi et al. | |
| 7,181,594 B2 | 2/2007 | Wilkinson et al. | |
| 7,225,300 B1 | 5/2007 | Choquette et al. | |
| 7,343,603 B1 | 3/2008 | Fresko | |
| 7,356,667 B2 * | 4/2008 | Harris | G06F 12/1081 709/245 |
| 7,373,466 B1 | 5/2008 | Conway | |
| 7,424,599 B2 | 9/2008 | Kissell et al. | |
| 7,437,724 B2 | 10/2008 | Wolrich et al. | |
| 7,472,253 B1 | 12/2008 | Cameron et al. | |
| 7,512,769 B1 | 3/2009 | Lowell et al. | |
| 7,668,165 B2 | 2/2010 | Hoskote | |
| 8,250,519 B2 | 8/2012 | Budko et al. | |
| 8,327,187 B1 | 12/2012 | Metcalf | |
| 8,386,745 B2 * | 2/2013 | Kegel | G06F 12/10 711/205 |
| 8,656,397 B2 * | 2/2014 | Eidus | G06F 9/5088 718/102 |
| 8,667,249 B2 | 3/2014 | Baxter et al. | |
| 8,850,168 B2 | 9/2014 | Yamamoto et al. | |
| 8,984,255 B2 * | 3/2015 | Hsu | G06F 12/1027 711/122 |
| 9,081,501 B2 | 7/2015 | Asaad et al. | |
| 9,081,706 B2 | 7/2015 | Koka et al. | |
| 9,122,714 B2 | 9/2015 | Varadarajan et al. | |
| 9,208,103 B2 * | 12/2015 | Kessler | G06F 12/1045 |
| 9,235,529 B2 | 1/2016 | Koka et al. | |
| 9,250,901 B2 | 2/2016 | Sodhi et al. | |
| 9,251,089 B2 | 2/2016 | Gschwind | |
| 9,268,694 B2 * | 2/2016 | Snyder, II | G06F 12/0808 |
| 9,367,459 B2 | 6/2016 | Yamashita et al. | |
| 9,582,312 B1 | 2/2017 | Karppanen | |
| 9,639,476 B2 * | 5/2017 | Chin | G06F 12/1027 |
| 9,645,941 B2 * | 5/2017 | Mukherjee | G06F 12/1036 |
| 9,690,714 B1 | 6/2017 | Sites | |
| 9,785,557 B1 * | 10/2017 | Frey | G06F 12/0837 |
| 9,996,386 B2 | 6/2018 | Rauchfuss et al. | |
| 10,037,227 B2 | 7/2018 | Therien et al. | |
| 10,114,958 B2 * | 10/2018 | Sell | G06F 9/45558 |
| 10,133,675 B2 * | 11/2018 | Hansson | G06F 12/1009 |
| 10,180,913 B1 | 1/2019 | Aingaran et al. | |
| 2002/0026502 A1 | 2/2002 | Phillips | |
| 2004/0064668 A1 | 4/2004 | Kjos et al. | |
| 2004/0117593 A1 | 6/2004 | Uhlig et al. | |
| 2004/0215893 A1 | 10/2004 | Emerson et al. | |
| 2005/0010728 A1 | 1/2005 | Piry et al. | |
| 2005/0165758 A1 | 7/2005 | Kasten et al. | |
| 2005/0138515 A1 | 8/2005 | Hyduke | |
| 2005/0273571 A1 | 12/2005 | Lyon et al. | |
| 2006/0253894 A1 | 11/2006 | Bookman | |
| 2006/0277390 A1 | 12/2006 | Zuraski et al. | |
| 2006/0288177 A1 | 12/2006 | Shaw | |
| 2007/0180197 A1 | 8/2007 | Wright et al. | |
| 2007/0186054 A1 | 8/2007 | Kruckmeyer et al. | |
| 2008/0104557 A1 | 5/2008 | Gopaladrishnan et al. | |
| 2008/0270653 A1 | 10/2008 | Balle et al. | |
| 2009/0089537 A1 | 4/2009 | Vick et al. | |
| 2009/0113164 A1 | 4/2009 | Rajamony et al. | |
| 2009/0172343 A1 | 7/2009 | Savagaonkar | |
| 2009/0182971 A1 | 7/2009 | Greiner et al. | |
| 2009/0234987 A1 | 9/2009 | Lee et al. | |
| 2011/0113410 A1 | 5/2011 | Loen | |
| 2011/0145542 A1 | 6/2011 | Morrow | |
| 2011/0208935 A1 | 8/2011 | Grisenthwaite | |
| 2012/0324148 A1 | 12/2012 | Stonelake et al. | |
| 2013/0179666 A1 | 7/2013 | Yamashita et al. | |
| 2013/0227248 A1 | 8/2013 | Mehta et al. | |
| 2014/0006734 A1 | 1/2014 | Li et al. | |
| 2014/0013074 A1 | 1/2014 | Koka | |
| 2014/0052917 A1 | 2/2014 | Koka et al. | |
| 2014/0208064 A1 | 7/2014 | Basu et al. | |
| 2014/0281363 A1 | 9/2014 | Tian | |
| 2014/0351519 A1 | 11/2014 | Munoz | |
| 2015/0106571 A1 | 4/2015 | Bernard et al. | |
| 2015/0205885 A1 | 7/2015 | Zhou et al. | |
| 2015/0254104 A1 | 9/2015 | Kessler et al. | |
| 2015/0286639 A1 | 10/2015 | Bordawekar | |
| 2015/0301949 A1 | 10/2015 | Koka et al. | |
| 2015/0301951 A1 | 10/2015 | Bybell et al. | |
| 2015/0325272 A1 | 11/2015 | Murphy | |
| 2016/0085677 A1 | 3/2016 | Loh et al. | |
| 2016/0147555 A1 | 5/2016 | Hepkin | |
| 2016/0147620 A1 | 5/2016 | Lesartre et al. | |
| 2016/0239415 A1 | 8/2016 | David et al. | |
| 2016/0283399 A1 | 9/2016 | Das | |
| 2017/0031832 A1 | 2/2017 | Hwang | |
| 2017/0109289 A1 | 4/2017 | Gonzalez | |
| 2017/0147254 A1 | 5/2017 | Adams et al. | |
| 2017/0153987 A1 | 6/2017 | Gaonkar et al. | |
| 2017/0161194 A1 | 6/2017 | Loh | |
| 2017/0177484 A1 | 6/2017 | Conway | |
| 2017/0185528 A1 | 6/2017 | Hansson et al. | |
| 2017/0236243 A1 | 8/2017 | Smith | |
| 2017/0286421 A1 | 10/2017 | Hayenga et al. | |
| 2018/0018278 A1 | 1/2018 | Bradbury et al. | |
| 2018/0150315 A1 | 5/2018 | Dunham et al. | |
| 2018/0150321 A1 | 5/2018 | Dunham et al. | |
| 2018/0150322 A1 | 5/2018 | Dunham et al. | |

OTHER PUBLICATIONS

C. H. Park, T. Heo, J. Jeong and J. Huh, "Hybrid TLB coalescing: Improving TLB translation coverage under diverse fragmented

(56) References Cited

OTHER PUBLICATIONS memory allocations," 2017 ACM/IEEE 44th Annual International Symposium on Computer Architecture (ISCA), Toronto, ON, 2017, pp. 444-456.
Chao-Jui Chang, Jan-Jan Wu, Wei-Chung Hsu, Pangfeng Liu, and Pen-Chung Yew. 2014. Efficient memory virtualization for Cross-ISA system mode emulation. SIGPLAN Not. 49, 7 (Mar. 2014), 117-128.
Grocutt et al., U.S. Appl. No. 15/825,524 unpublished application, filed Nov. 29, 2017.
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008.
M. D. Flouris and A. Bilas, "Violin: a framework for extensible block-level storage," 22nd IEEE / 13th NASA Goddard Conference on Mass Storage Systems and Technologies (MSST'05), Monterey, CA, USA, 2005, pp. 128-142.
Porquet, J & Greiner, A & Schwarz, C., "NoC-MPU: A secure architecture for flexible co-hosting on shared memory MPSoCs," Design, Automation & Test. in Europe, 1-4, 2001.
Sambit K. Shukla, Laxmi N. Bhuyan, "A hybrid shared memory heterogenous execution platform for PCIe-based GPGPUs," 2013 20th International Conference on High Performance Computing (HiPC), vol. 1, pp. 343-352, 2013.
T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015.
U.S. Appl. No. 15/825,524, filed Nov. 29, 2017, Inventor: Grocutt et al.
Arm, "ARMv8-A Address Translation," https://static.docs.arm.com/100940/0100/armv8_a_address%20translation_100940_0100_en.pdf, Feb. 28, 2017.
Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.
Anonymous, "Fork (system call)," https://web.archive.org/web/20150124080230/https://en.wikipedia.org/wiki/Fork_(system_call), Jan. 24, 2015.
Oehmke, David W., Nathan L. Binkert, Steven K. Reinhardt and Trevor J Mudge. "Design and Applications of a Virtual Context Architecture." (2004).
Jayneel Gandhi, "Efficient Memory Virtualization," Thesis, University of Wisconsin-Madison, Aug. 19, 2016.
Memory Management Basics, www.idc-online.com/technical_references/pdfs/information_technology/Memory_Management_Basics.pdf, 2014.
Zhong Shao, CS422/522 Design & Implementation of Operating Systems Lecture 13: Address Translation, Yale University, Oct. 15, 2015, https://web.archive.org/web/20151217223456/http://flint.cs.yale.edu/cs422/lectureNotes/L13,pdf.
Rouse, Margaret, Definition translation lookaside buffer (TLB), https://whatis.techtarget.com/definition/translation-look-aside-buffer-TLB, Sep. 2014.
U.S. Appl. No. 15/361,871, filed Nov. 28, 2016 entitled "Data Processing", Applicant Arm Ltd.
U.S. Appl. No. 15/361,819, filed Nov. 28, 2016 entitled "Data Processing", Applicant Arm Ltd.
U.S. Appl. No. 15/361,770, filed Nov. 28, 2016 entitled "Data Processing", Applicant Arm Ltd.
Anedda et al., "Suspending, migrating and resuming HPC virtual clusters," Future Generation Computer Systems 26, May 20, 2010, pp. 1063-1072.
Basu et al, "Efficient virtual memory for big memory servers," ACM SIGARCH Computer Architecture News—ICSA '13, vol. 41 Issue 3, Jun. 2013, pp. 237-248.
J. Gandhi et al., "Range Translations for Fast Virtual Memory," in IEEE Micro, vol. 36, No. 3, pp. 118-126, May-Jun. 2016. doi: 10.1109/MM.2016.10.
Karakostas et al., "Redundant Memory Mappings for Fast Access to Large Memories," ISCA'5, Jun. 13-17, 2015.
R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.
Petter Svärd, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

\* cited by examiner

| | | | | | | |
|---|---|---|---|---|---|---|
| | - | OFFSET | VA_BASE | VA_EXTENT | | PRE-COPY |
| | P | OFFSET | VA_BASE | VA_EXTENT | - | COPY STEP 1 |
| | P | OFFSET | VA_BASE | VA_EXTENT | C | COPY STEP 2 |
| | P | NEW OFFSET | NEW VA_BASE | VA_EXTENT | C | COPY STEP 3 |
| | P | UPDATED OFFSET | NEW VA_BASE | VA_EXTENT | C | WRITE STEP 1 |
| | P | UPDATED OFFSET | NEW VA_BASE | VA_EXTENT | - | WRITE STEP 2 |

RANGE TABLE ENTRY A-COPY

| | | | | |
|---|---|---|---|---|
| - | OFFSET | VA_BASE | VA_EXTENT | |
| P | OFFSET | VA_BASE | VA_EXTENT | - |
| P | OFFSET | VA_BASE | VA_EXTENT | C |
| P | OFFSET | VA_BASE | VA_EXTENT | C |
| P | OFFSET | VA_BASE | VA_EXTENT | C |
| P | OFFSET | VA_BASE | VA_EXTENT | - |

RANGE TABLE ENTRY A

FIG. 10

MEMORY SYSTEM FOR A DATA PROCESSING NETWORK

CROSS-REFERENCE TO RELATED APPLICATIONS

This application is a continuation-in-part of U.S. patent application Ser. No. 15/650,008 entitled "MEMORY NODE CONTROLLER", filed Jul. 14, 2017, which is hereby incorporated by reference in its entirety.

This application is related to the following co-pending Patent Applications: U.S. patent application Ser. No. 15/650,056 entitled "MEMORY ADDRESS TRANSLATION", filed Jul. 14, 2017, U.S. patent application Ser. No. 15/649,930 entitled "METHOD AND APPARATUS FOR TWO-LAYER COPY-ON-WRITE", filed Jul. 14, 2017, U.S. patent application Ser. No. 15/649,976 entitled "METHOD AND APPARATUS FOR FAST CONTEXT CLONING IN A DATA PROCESSING SYSTEM", filed Jul. 14, 2017, U.S. patent application Ser. No. 15/819,378, entitled "RANGE-BASED MEMORY SYSTEM", filed on the same date as this application, and U.S. patent application Ser. No. 15/819,574, entitled "FAST ADDRESS TRANSLATION FOR VIRTUAL MACHINES", filed on the same date as this application. These applications are hereby incorporated by reference herein in their entirety.

STATEMENT REGARDING FEDERALLY SPONSORED RESEARCH OR DEVELOPMENT

This invention was made with Government support under the Fast Forward 2 contract awarded by DOE. The Government has certain rights in this invention.

TECHNICAL FIELD

The present disclosure relates to the control of physical device memory in a data processing network.

BACKGROUND

A data processing system may include multiple computing devices of various types and multiple memory resources of different types. For example, an embedded data processing system may combine network technologies with wireless computing, voice recognition, Internet capability and artificial intelligence to enable connectivity of a device.

A system may include, for example, dynamic random-access memory (DRAM), a block device, a remote direct memory access (RDMA) appliance, memory located on a hardware accelerator and other types of volatile and non-volatile memory. Memory and other resources within the data processing system are addressed by a system address space, while each memory device is addressed by a physical address space.

The mapping between a system address and a corresponding physical address may be performed statically, by software calls to an operating system, or through hardware caching of the software mediated translation process. Such approaches do not provide optimal use of memory, particularly when memory resources are shared between multiple processing cores or multiple processes and when memory resources have different characteristics.

BRIEF DESCRIPTION OF THE DRAWINGS

FIG. 10 illustrates range table entries in two-layer copy-on-write mechanism, consistent with embodiments of the disclosure.

DETAILED DESCRIPTION OF THE EMBODIMENTS

Figure 1:
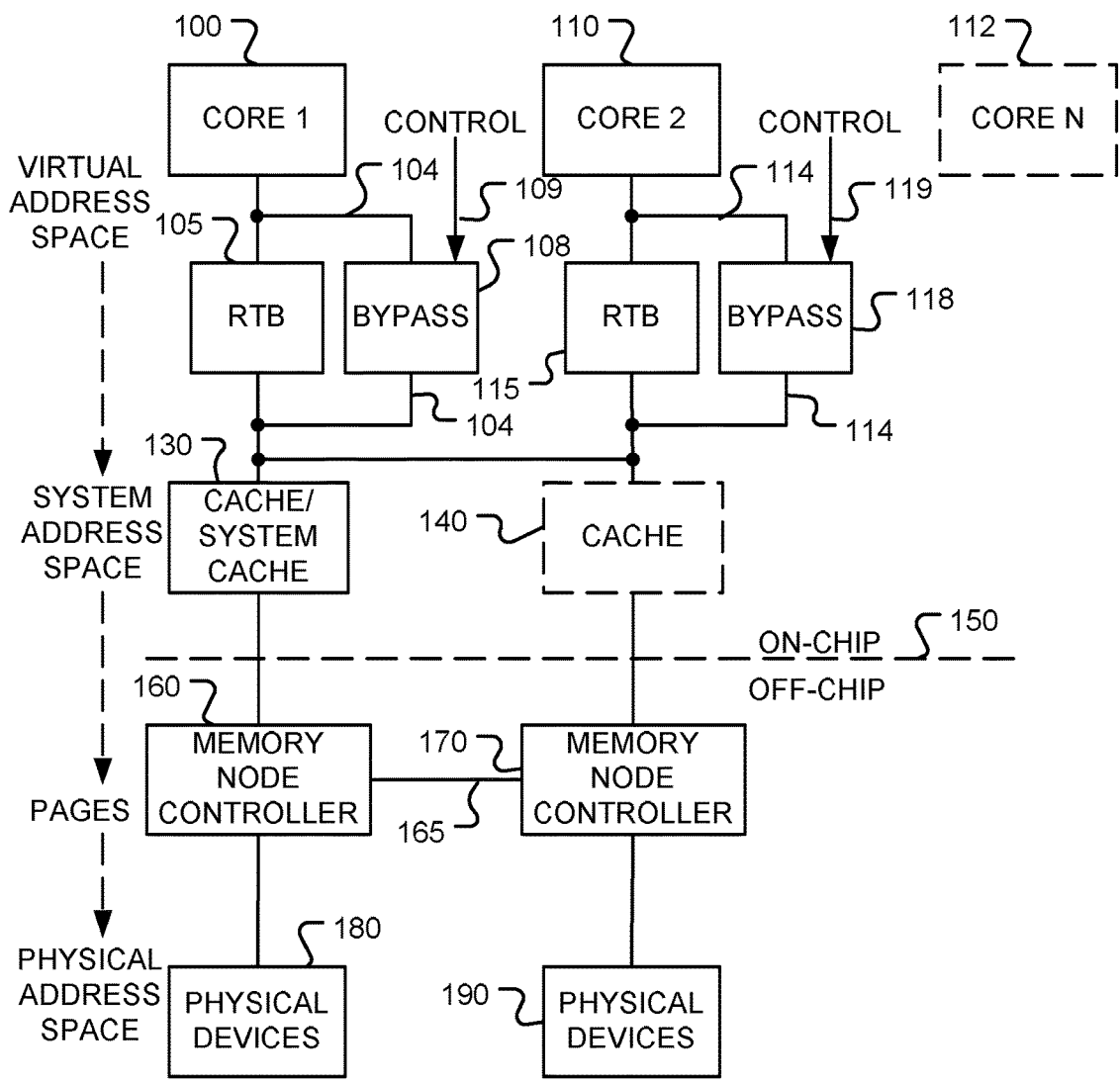
FIG. 1 shows a data processing network, consistent with certain embodiments of the disclosure.

While this invention may be embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure relates to a memory system that can be managed and/or accelerated in hardware. The memory system utilizes range tables, memory node controllers and, optionally, data delivery caches, to implement mechanisms such as memory allocation, data movement, range coherence modification and copy on write (hereafter CoW) techniques. In addition, the memory system may be compliant with the POSIX programming interface standard of the IEEE Computer Society.

The memory system may be implemented in hardware, software, or a combination of hardware and software.

In one embodiment, the memory system adds acceleration for in-hardware data movement, translation and compute-in-memory. It enables a process (execution thread) to exist in an isolated address space, allocate memory, deallocate memory, and implement all of memory functions required by the POSIX standard, while doing so managed entirely by hardware. In contrast, conventional memory systems are managed in software by an operating system. This combination enables more efficient allocation, CoW, data migration, optimal data placement, accelerator offload (General Purpose computing of Graphics Processing Units (GPGPU) and others), and has application to general purpose compute-near-memory systems or sparse-data-reduction-near-memory systems. The memory system is configurable so that an implementer can choose where to divide the responsibilities between hardware and software. It gives the implementer the freedom to choose between fully hardware managed or software managed hardware with many levels in between so that it fits the widest range of application areas possible. To achieve this, an embodiment may bring together the following sub-components:

Range Table—The range table is a memory-backed representation of translations from user-facing virtual addresses to system addresses, where a user is a process or thread executing on a computing device, for example. The system address space has all elements of the system, such accelerators, storage devices and network interface controllers (NICs), mapped into it. This provides low-latency memory translation and transparent memory technology placement across all types of devices in a system. Translation from a virtual to a system address happens at the range table level, while translation from a system address to a physical address happens within a memory node controller, discussed below. The system address encompasses all storage media (memory, block devices, non-volatile, network storage, etc.), including accelerators. All storage, memory, and NIC functions are virtualized behind the system address layer. This means that the allocated memory could be on any one of these devices, over the network via remote direct memory access (RDMA), or even on an accelerator attached to a peripheral component interconnect. System addresses may or may not be backed by any physical address. This enables faster memory allocation, for example.

Range Table Buffer—The range table buffer is a range table cache that stores range entries for multiple virtual address spaces and enables fast look-up of range entries for a given virtual address in order to perform the virtual to system address space translation. This range table buffer can be single or multi-level. It is aware of the range table memory representation of a virtual address space's ranges.

Two Layer Copy-on-Write—This is a mechanism to provide efficient copy-on-write performance for the memory system.

Memory Node Controller (MNC)—This is a mechanism to provide efficient translation of system to physical device addresses, provide transparent cross-technology data migration and integration of all memory/storage technologies behind one address space (the system address space). The MNC also enables feed-forward pushing of data from the MNC controlled memory space (system address space) to a data delivery cache (DDC) located closer to the main core.

Data Delivery Cache (DDC, optional)—The DDC is a cache that may be implemented, for example, in a memory technology on chip. Unlike other caches, its fills and evictions are directed by the MNC. The DDC serves as a translation filter within the system address space, reducing the overall number of translations required from the system address space to the physical address space by the MNC.

Nested Virtualization (Fast Translation for Virtual Machines)—With the range table implementation, the system provides a means to perform O(1) nested translation lookups with k levels of translation. This is beneficial for cloud environments, for example, that often run k levels of translation, each with nested page translation in current systems. With the disclosed memory system, each nested level is simply an additional offset calculation.

Hardware components of the memory system may be accessed via instructions of an instruction set architecture (ISA). These instructions enable traditional software-driven operations to be hardware-driven. Optionally, supervision of the memory system may be controlled by software.

The system address space provides a unified address space across all devices in the system. This intermediary step between the virtual and physical address spaces enables concepts such as compute near memory, reduces the need for cache flushing with page placement, and eliminates the need for translation between, for example, accelerators and CPUs.

System Overview

FIG. 1 is a schematic illustration of a data processing network consistent with embodiments of the disclosure. Referring to FIG. 1, the data processing network includes a number of processor cores 100, 110. In the example of FIG. 1, two such processor cores are illustrated, but (as shown schematically by the broken line box 112) more processor cores could be provided. Alternatively, the system could use just one processor core.

The processor cores are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

For each set of processor cores 100, 110, the coherence network of these caches may be partitioned to remain coherent around a single MNC, with the MNC providing coherence at a larger scale. In this approach, memory access requests are routed to a designated MNC. A cluster of processors may or may not be coherent with the other clusters. However, the MNC's are page-coherent with each other. This approach reduces the amount of traffic needed to maintain coherence.

First Layer Memory Address Translation

Elements of the data processing network, such as memory and other resources, are addressable by system addresses in a system address space. A memory address translation apparatus is provided to translate between the virtual memory addresses in the virtual memory address space and system addresses in the system address space. This system address space could be accessed via indirection or via a processing device accessing this system address space as an anonymous physical space (i.e., the physical memory for the processing device is virtualized). The system addresses are "output" memory addresses of the first layer. A system address could represent a physical address by which a physical memory device or other addressable unit could be physically addressed. Alternatively, the system addresses could represent addresses that need a further stage of address translation before being used to access a physical memory device or other addressable unit. From the point of view of address translation techniques, these options are equivalent. That is to say, the address translation techniques start with a virtual memory address and produce a system memory address. A further stage of address translation on the system address is provided by memory node controllers 160 and 170. In this example, the addresses passed to the memory node controller are from ranges. However, in an alternative embodiment, the addresses passed to the memory node controller are provided by a conventional page-based virtual memory system that sits on top of the MNC layer. In this implementation, the page-based virtual memory layer would treat them as physical device addresses, but the MNC would treat these as system addresses. In a still further approach, a conventional segment-based translation scheme is implemented on top of the system address space. In this approach, segment assignment may be instituted by a programmer.

In FIG. 1, address translation is carried out by a so-called range table buffer (RTB) 105, 115. This performs address translation between a virtual memory address in the virtual memory address space and a system memory address in the system (output) address space. Each of the processor cores has a respective range table buffer. Operation of the range table buffer is described in detail in co-pending U.S. patent application Ser. No. 15/650,056 entitled "MEMORY ADDRESS TRANSLATION", filed Jul. 14, 2017, which is hereby incorporated by reference herein, in its entirety. However, other address translation techniques may be used, such as a translation look-aside buffer (TLB) or a software mediated translation technique, for example.

Bypass logic 108, 118 is provided to selectively bypass the RTBs 105, 115 when the address translation is such that a virtual memory address is equal to a corresponding system memory address. The bypass circuitry or logic is controllable by a control signal 109, 119 which will be discussed below. When the bypass logic is enabled, either the RTBs 105, 115 do not perform any translation, or the translation performed by the RTBs 105, 115 is ignored and the virtual memory address is provided by a bypass route 104, 114 for use as the output memory address.

Processor cores 100, 110 are implemented or fabricated on an integrated circuit substrate in this example, and may both (or all, in the case of more than two) be provided on the same integrated circuit substrate. These devices are referred to in FIG. 1 as being "on-chip".

Also provided on-chip, is a cache and/or system cache memory 130, called a data delivery cache (DDC) to provide a temporary store for a subset of data held by the memory system to be discussed below, such as a most-recently accessed subset and/or a speculatively fetched subset. As shown in FIG. 1, processor cores 100 and 110 share a common cache/system cache 130. However, in other examples more than one cache could be provided, and another cache 140 is shown in broken line to illustrate such an arrangement. In one embodiment, the cache may be accessed in parallel with the cache/system cache 130, making use of a virtual index and system address tag.

In one embodiment, the cache/system cache 130 (140) operates according to the system (output) memory addresses generated by the RTBs 105, 115. In another embodiment, the first level cache is accessed in parallel with the RTBs 105,115.

Broken line 150 indicates a logical boundary between on-chip devices and off-chip devices, although it will be appreciated that this is just an example and that the implementation of any of the modules shown in FIG. 1 on the same integrated circuit or as different circuitries is a matter for a system designer. Thus, FIG. 1 represents a schematic example of how the separation of on-chip and off-chip components might be achieved.

Memory Node Controller

One or more memory node controllers 160, 170 are provided, which in turn access one or more respective physical devices 180, 190 such as random-access memories (DRAMs), Phase-Change memories (PCMs), and High Bandwidth Memories (HBMs) for example. The memory node controllers may be located on-chip or off-chip. Given that the physical devices 180, 190 operate in a physical address space, functions of the memory node controllers 160, 170 can include: (a) translation of system (output) memory addresses to physical device memory addresses, if a further stage of translation is needed, and (b) management of which of the physical devices 180, 190 needs to be accessed in order to implement a required memory access operation.

The translation operation (a) mentioned above is a second layer address translation and can be carried out either using the techniques to be discussed below, or by a known memory address translation technique. The management operation (b), to manage which of the physical devices 180, 190 should be accessed, can be carried out using, for example, a table or directory stored at one or more of the memory node controllers 160, 170 to indicate a partitioning of the physical address space between physical devices and, in turn, memory node controllers.

In the example of FIG. 1, two memory node controllers are provided. If one of the memory node controllers (such as a the memory node controller 160) receives a request for a memory access transaction which relates to an address handled by another memory node controller such as the memory node controller 170, the first memory node controller 160 can communicate via a data connection 165 with the other memory node controller 170, passing on the system address relating to that transaction and requesting that the transaction be carried out by the second memory node controller 170.

In accordance with certain embodiments, an MNC provides a dedicated hardware mechanism to collect and use metadata, including performance statistics such as re-use distance. The metadata is used to provide better placement of memory pages in the available technology.

As described above, an MNC maps at least a partition of the system address space of a data processing network to physical device memory space. The MNC provides a mapping function from the system address space to a physical space in a resource such as, for example, a DRAM device, a block device, a remote direct memory access (RDMA) appliance, or memory located on a hardware accelerator. An RDMA appliance may be any memory or storage device used for remote memory access. The MNC provides functionality for writing to a system address, maintaining page level ownership across a memory fabric, optimally placing pages in memory via metadata tracking, and the feeding forward of data to a fast on-chip memory. The MNC is implemented in hardware and may be part of an integrated circuit having additional functions. The MNC may be synthesized from a netlist or hardware description language (HDL) representation, for example.

In accordance with certain embodiments, a MNC provides a single abstraction of resources such as storage, memory, or a network interface controller (NIC) into a single system address space.

In accordance with certain embodiments, a MNC provides a means to treat memory at the MNC page level as "shareable" between multiple MNC(s). The MNC provides means to treat memory as "shareable" across multiple data delivery caches.

In accordance with certain embodiments, a MNC provides a second layer of a Copy-on-Write apparatus. Operation of the Copy-on-Write apparatus is described in detail in co-pending U.S. patent application Ser. No. 15/649,930 entitled "METHOD AND APPARATUS FOR TWO-LAYER COPY-ON-WRITE", filed Jul. 14, 2017, which is hereby incorporated by reference herein, in its entirety.

In accordance with certain embodiments, a MNC provides an efficient means to perform a single copy operation. This may be provided, for example, to all levels of an accelerator device and may be provided via a NIC.

In accordance with certain embodiments, a MNC is part of a memory fabric configured following a memory server model, where the memory fabric services memory requests from various local or remote computing devices of a data processing network.

Figure 2:
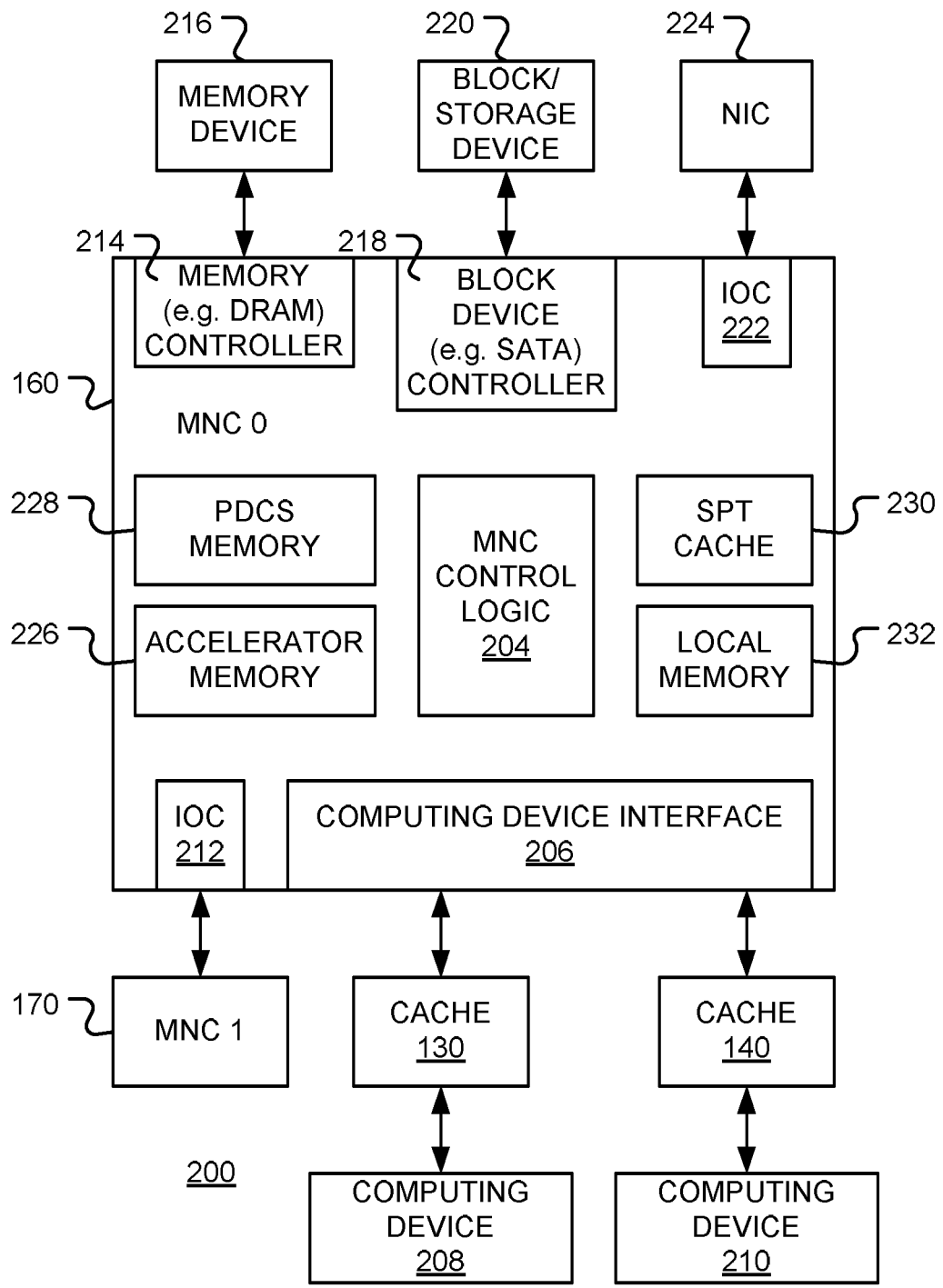
FIG. 2 is a further block diagram of a data processing network, consistent with embodiments of the disclosure.

FIG. 2 is a block diagram of a data processing network 200 consistent with embodiments of the disclosure. Data processing network 200 includes first memory node controller (MNC 0) 160 and, optionally, one or more second memory node controllers such as MNC 1 170. MNC 160 includes control logic 204 that is coupled to number of other functional blocks.

Device interface 206 enables MNC 160 to interact with multiple computing devices 208 and 210 and other devices such as hardware accelerators. A computing device may be on-chip or off-chip. System 200 is configured as a network in which MNCs 160 and 170 provide network nodes that interconnect computing devices, such as 208 and 210, with memory resources. In one embodiment, device interface 206 is compliant with the 'Peripheral Component Interconnect Express' (PCIe) standard. PCIe is a non-proprietary standard for interconnecting internal devices in a computer. For example, device interface 206 may include a PCIe root complex that enables connection with multiple computer elements or virtualized PCIe devices. When multiple MNC nodes are used, the node is 'multi-root' in the PCIe standard. However, an MNC can also support single root virtualization for guest operating systems for backwards compatibility. Devices on an MNC network are recognized via a virtualized hardware mediated PCI device tree.

The use of MNCs and range-based address translation enables all compute devices, both hosts and accelerators for example, to be connected on a uniform fabric.

IO Controller

MNC 160 also includes IO Controller (IOC) 212. IOC 212 is a generic interconnect or bus that enables connection to off-chip components. This may be a custom physical layer with a protocol that enables response to or transport of commands. The commands may be instruction set architecture (ISA) level memory instructions, for example. IOC 212 may operate under a standard structure such as a PCIe-v4 structure, for example. Other physical layers could be used depending on the characteristics required by the MNC and overall system. IOC 212 enables communication with other MNC devices.

Memory Controller

MNC 160 also includes memory/storage components such as memory controller 214 (such as one or more DRAM controllers) that enables coupling with memory device 216, block device controller 218 (such as a SATA controller, for example) for coupling with block devices 220. Each device is mapped to a physical range of memory that can be virtualized further by an operating system.

Additionally, IO Controller 222 enables connection to a device such as network interface controller 224.

In the embodiment shown in FIG. 2, MNC 160 also includes accelerator physical memory 226, fast local memory 232 (such as combined DRAM/NV 3-D integrated memory, for example) for use as local buffer for data rearrangement, compute in-memory and for NIC and RDMA transactions.

Physical Device Configuration Setup (PDCS) Memory

Configuration data is stored in Physical Device Configuration Setup (PDCS) memory 228. For example, the mapping of accelerator physical memory 226 through system address space may be stored in PDCS memory 228. The physical device configuration information is provided to the MNC either via firmware interface, on board non-volatile memory (such as SPI-flash or equivalent), small persistent removable storage (such as a microSD card), or any other method that can transmit information for physical mapping configurations and other configurations such as channel and interrupt assignments. Physical devices, such as SATA, PCIe, SSD, DRAM, and others, are mapped from system address ranges to the physical device ranges.

In one embodiment, the PDCS memory stores information that tells the MNC about devices present on the network. This enables devices to "map" each other virtually from memory space specified into their operating systems and file systems.

Information relating to storage devices is slightly different, and tells the MNC what devices are attached, their characteristics, and what bus lanes or channels they are to be assigned. In addition, for PCIe accelerators, other configuration data might need to be provided as well as the system address mapping of the accelerator device so it can be mapped into the system address space of the host operating system for virtualization.

In summary, the configuration information in the PDCS memory provides the MNC with the information it needs to actuate external devices and map devices such as accelerators, computing devices and network interface controllers, into the system address space to enable virtualization. This information may supplement or replace a traditional device configuration within a kernel.

Other memory node controllers can easily be discovered through handshake at startup, but they could also be specified directly within the configuration information.

System to Physical Translation (STP) Cache Structure.

System to Physical Translation (STP) Cache structure 230 holds the translation structure that maps the system addresses to physical pages on various devices. An example implementation of this structure is a sparse hash map with the most frequently used N translations resident in static random-access memory (SRAM), with overflow moving to DRAM allocated by the MNC memory controller 214 through the STP cache. In some embodiments, the SRAM in the STP cache may be large enough to store most address translations. The translation from system address to physical address may be performed via a hash map and, in some hash map implementations, can be performed on a single clock cycle edge.

Caches

Caches 130 and 140 may be near-edge-of-network data caches to facilitate data transfer to and from MNC 160. These are termed data delivery caches (DDC) and may be located on-chip. Within MNC 160, memory is broken into pages that represents a specific quanta of memory (such as 4K regions), which can be placed on any type of physical device. Breaking the larger ranges into smaller pages enables improved memory technology placement and provides an upper limit for metadata collection, since data only needs to be kept at page granularity. The metadata enables memory node controller 160 to place physical pages on the most optimal memory/storage technology (based on some cost function) and, in addition, use a 'feed-forward' approach to page placement to on-chip caches. In a feed-forward approach, the MNC feeds pages of data (at some granularity) optimal for the core and application (i.e., based on bandwidth requirements, re-use distance, etc.) to high bandwidth/low latency memory on the core right where it is needed.

Network Configuration

Figure 3:
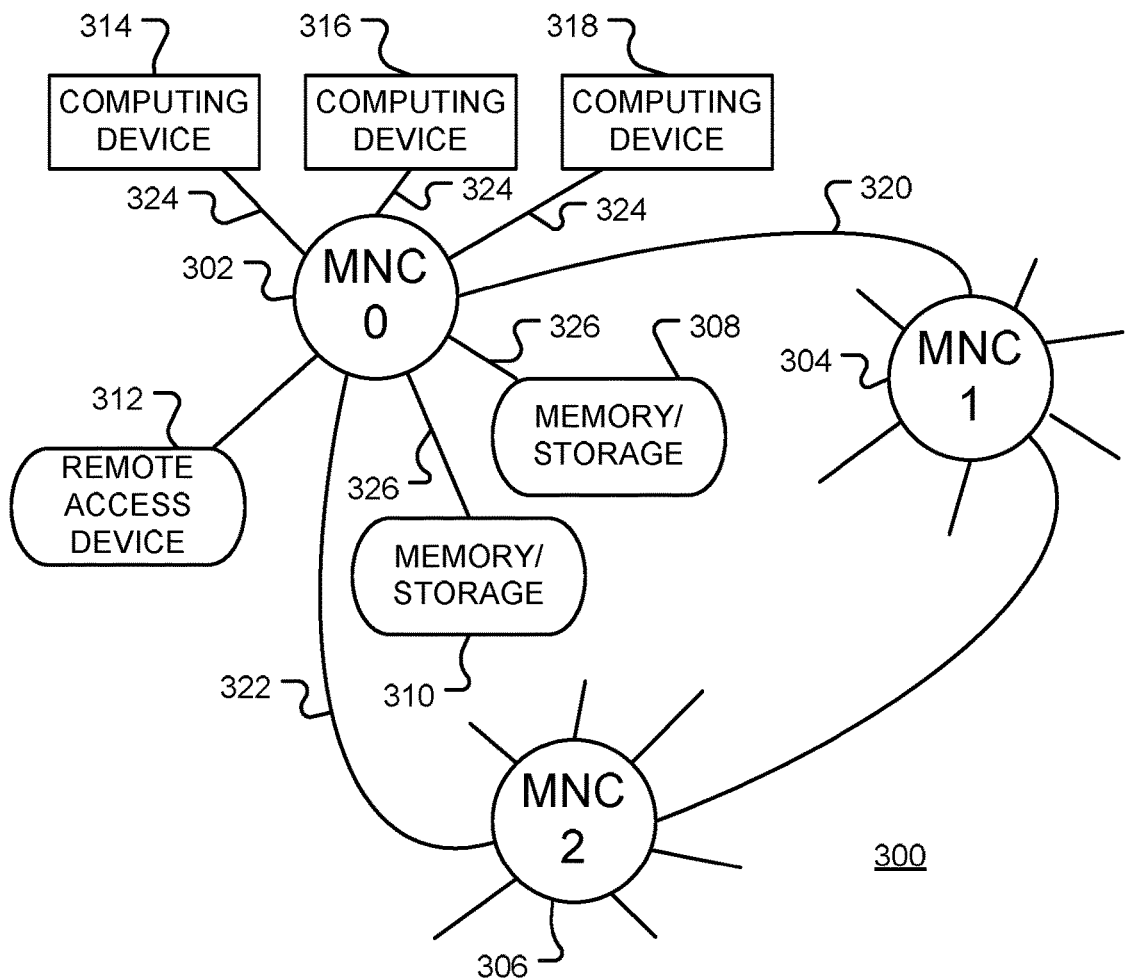
FIG. 3 is a block diagram of a simplified network incorporating memory node controllers, consistent with embodiments of the disclosure.

FIG. 3 is a block diagram of a simplified network 300 incorporating memory node controllers consistent with the disclosure. Simplified network 300 includes nodes 302, 304 and 306. Each node includes a memory node controller (MNC). Memory/storage elements 308 and 310 are in the home range of MNC-0 at node 302, as is remote access device 312 (which may be accessed via a NIC for example). Access to these elements is provided by MNC-0 (302). Network 300 is arranged as a cluster network in which MNC-0 at node 302 is configured to provide memory/storage resources to a cluster of computing devices 314, 316 and 318. These may be processor cores or other computing devices. Similarly, MNCs at nodes 304 and 306 of the network will each serve a cluster of computing devices and control access to dedicated memory/storage elements. The MNC is coupled to computing devices 314, 316 and 318 via channels 324 and to Memory/storage elements 308 and 310 via channels 326.

A function of MNC 302 in network 300 is to serve memory pages to local devices 314, 316 and 318 or to devices coupled via other nodes 304 and 306. MNC-0 at node 302 is coupled to MNC-1 at node 304 via link 320 and to MNC-2 at node 306 via link 322. It will be apparent to those of skill in the art that different network topologies may be used, and may use any number of nodes, computer elements and memory/storage devices.

In operation, requests sent from a computing device to an MNC reference a system address. Requests sent from an MNC to a memory/storage resource reference a physical (or network) address. The MNC is configured to perform a translation from system address to physical address.

Routing of Memory Access Requests in the Network

One function of a memory node controller is the translation of system addresses to physical addresses. When request to access memory at a particular address is sent in a data processing system having a network of memory node controllers, it is routed to the appropriate MNC. Various routing techniques may be used. An embodiment may use a clustered memory node controller scheme, for example, as depicted in FIG. 3. In general, in a clustered scheme, there may be up to N cores or computing devices for each of K MNCs. These N computer elements will be clustered so that the most optimal routing is to that local memory node. Each memory request originating from these cores goes directly to the closest MNC. If the request is to a page that is statically allocated to that MNC or to a page dynamically shared from another MNC then the request may be immediately returned to the core. However, if another MNC owns the memory (as determined by a coherence protocol, for example), there is one additional network hop for the request before being fulfilled. When operation of the system is started, each MNC is assigned a division or partition of the overall system addressable space available to the system (with provision for re-partitioning to facilitate hot-swapping). Each of the partitions assigned to each memory node is then broken into pages. The advantage of this system is that locality is implicit through the MNC from which a memory request originates. The computing device accessing the nodes is known (or at least the cluster accessing the nodes), without additional data. Using that information, the MNC can migrate the data pages within the memory network, or check them out from the owner of the partition if the compute patterns warrant it.

A further advantage of this system is that when the system address space is used to identify data stored in caches, data can be migrated from one memory technology to another without flushing all caches in the coherence network of the lines that map to the data being migrated. In contrast, a flush would be necessary if the caches, L2 through LLC, were indexed and tagged by physical addresses, since their validity is predicated on the physical medium containing the data.

Consistent with some embodiments, checking out of pages is facilitated by a limited directory structure. The limited directory structure may be stored in a memory local to the MNC (such as local memory 232 in FIG. 2), so the limited directory structure is implicitly memory-backed and hardware-managed. In a further embodiment, the limited directory structure is stored in SRAM or other fast memory, so that when pages are checked out, they can be entered into the directory structure.

Referring again to FIG. 3, when a request from a core or computing device to access memory at a system address arrives to an MNC of the memory network 300 from the computing element, a routing calculation is performed using the system address. Since the MNC that receives the request only addresses part of the global address space, the request may need to be routed to another MNC in the network. If the current MNC doesn't control the memory partition containing the address, the request is forwarded to the appropriate MNC. For example, a request from computer element 314 to access an address in the home partition of MCN-1 at node 304 is received by MNC-0 at node 302 and forwarded to MNC-1 at node 304 via link 320.

When an address arrives in a request to the MNC from the core, a routing calculation is performed for the address. If the address is outside of the current memory node's partition, a range look-up for routing may be performed in parallel by consulting a directory to determine if the page is checked in from its external system address partition home node.

In parallel with determining routing for the system address, one of two operations could be performed, depending on implementation requirements. First, a hash could be consulted to see if the page (assuming the read address is outside of the current memory node's partition of the system address space) is checked out from its home node and currently resident in the current node (one performing the address calculation). The other option is to use a directory-like methodology that sends the request packet to the system address partition's home node and then that node determines if the page is checked out by a closer node. In this approach, the originating MNC (i.e. the first node to receive the request from the computing device) is encoded in the packet. This approach may require one additional network hop if the node is checked out locally but has the benefit of decreased overall data movement while retaining the benefit of data interleaving to a requesting socket.

Within the MNC, there are multiple data structures that could be used in hardware to store paging information. In one embodiment, a sparse hash map structure is used, which may be implemented as a tree structure, for example. On a write operation to a page that has no physical backing, the backing is created in a class of memory chosen by an optimization function (likely first in DRAM as an example), however, it could easily create a new dirty page in a non-volatile media. On read operations, a similar thing occurs. The operations may be performed on a page by page basis, where a page is a subset of a range at some granularity (4K, for example). In this way, range translation is provided and pages are striped/placed on the most efficient memory technology. A depiction of this structure is described below with reference. Each page can be put anywhere in the memory network by the MNC without the core having to make any change or take any action.

Since data may be shared between computer devices, a coherency protocol is used to prevent access to memory pages containing out-of-date data. To this end, the limited directory structure may be used to store the state of data pages.

Figure 4:
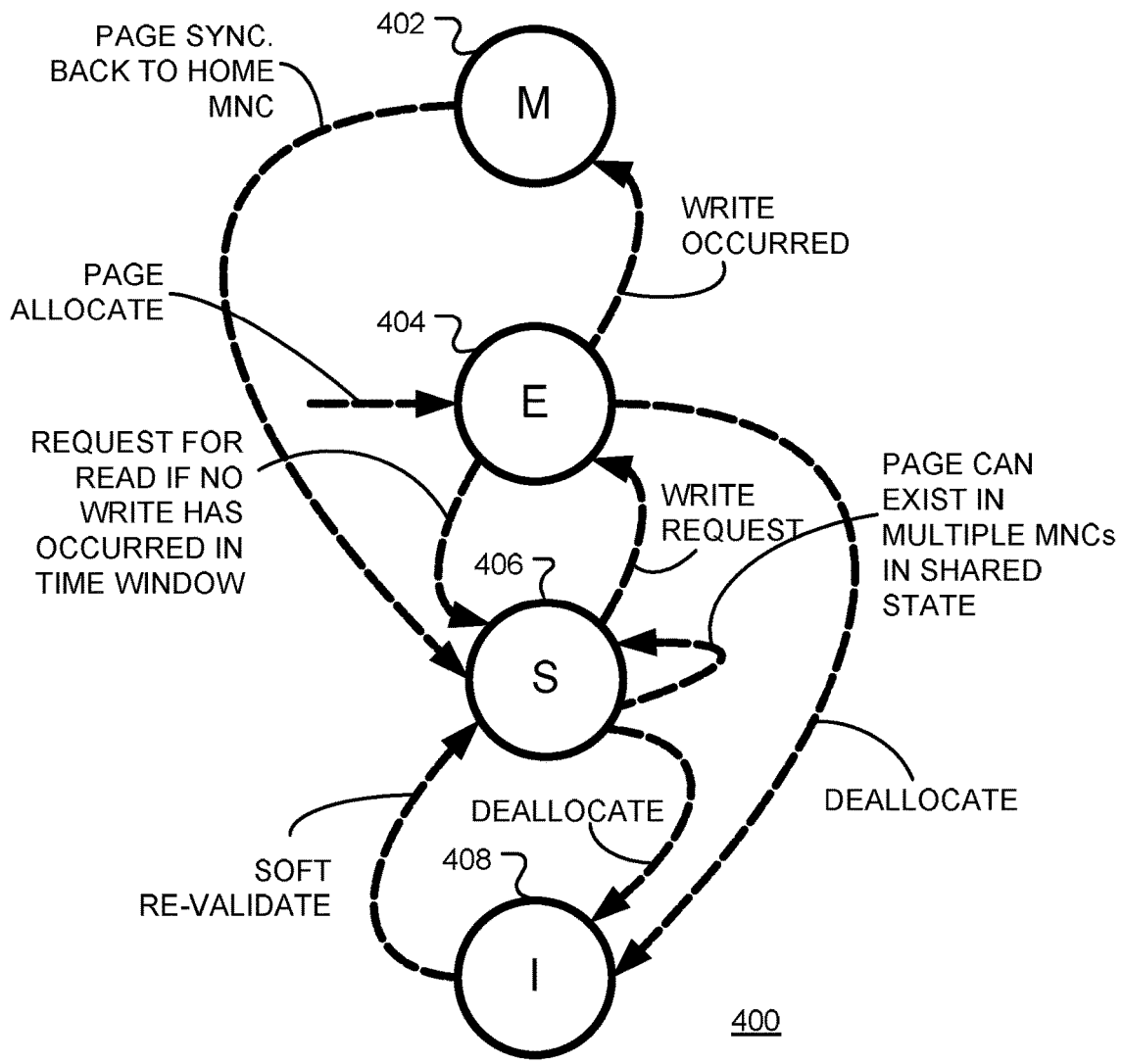
FIG. 4 shows a state diagram for a data coherency protocol, consistent with embodiments of the disclosure.

FIG. 4 shows an example state diagram 400 for a modified MESI protocol, consistent with embodiments of the disclosure. Data may be identified as being in one of four different states: "modified" (M) 402, "exclusive" (E) 404, "shared" (S) 406 and "invalid" (I) 408. MESI diagram 400 illustrates transitions between the different states. The state may be indicated by state bits in the metadata for each page, in addition to other data such as page utilization statistics, performance counters, etc. State diagram 400 illustrates a modified MESI protocol for MNC page sharing is managed within the MNC network.

Checked-out pages that are not from the current MNC's partition are termed 'foreign' pages and their checked-out states are recorded in the directory of the MNC, which may be stored in a local memory, for example. For pages in the partition of the current MNC, i.e. pages for which the current MNC is the home partition MNC, the checked-out status is indicated within the page metadata.

For example, when a page is allocated, it can be initially checked out from the home partition MNC in an "exclusive" state (E) 404. After the write has occurred, the state becomes "modified" (M) 402. After the page has been synchronized back the home partition MNC, the state returns to "shared" (S) 406.

If a page is deallocated when it is in an "exclusive" (E) state 404 or "shared" (S) state 406, the state is changed to "invalid" (I) 408. Optionally, pages can be returned to the "shared" (S) state 406 by a 're-validate' instruction.

In a further embodiment, an additional "exclusive for write only" state is used. A benefit of to having this additional state is that it enables a page to be marked by one MNC as being 'owned for writing at some later time', thus preventing other MNCs from writing to it. Subsequent writes would be committed once the function generating them finishes, after which the page would return to the 'S' state.

Checked out pages will eventually be migrated back to the home partition MNC, once space is needed in the directory structure or if the page is requested in shared state from other nodes. The movement of the page back to the home partition MNC is similar to a write-back of data to memory from a standard cache. However, the MNC may keep the page in persistent memory or volatile memory, its state as a checked-out page is indicated in the metadata.

Each MNC is assigned a chunk or partition of the complete system address space at start-up or during a renegotiation process. An example system address range may be: (base_address+0)→(base_address+n). This partition is further subdivided behind the MNC into physical addresses (or network addresses in the case of a NIC). The MNC controls access to all resources behind it that are capable of storing data, and maps the system address space to physical or network addresses in those resource. File systems and networking functionality may also be mapped into this address space. Accelerators with on-board memory are also mapped into this address space and may be accessible through an interface from their virtual address space, without needing knowledge of the system address space.

Starting on a processor core, a virtual memory address in a request is translated to an address in the system address space using a range translation buffer (RTB) or a translation look-aside buffer (TLB). The request is then sent to the memory node controller.

In first embodiment, the memory space is divided between the MNCs, so that there is a fixed static mapping after boot. This approach has the advantage of being fast for the routing calculation and always going to the correct node. However, this approach may not be optimal for on-chip routing or for optimizing memory placement. One reason that the fixed calculation is sub-optimal is that it increases on-chip memory traffic, which could otherwise be used for core-to-core (or thread-to-thread) communication. Another reason is that the overhead needed to support on-chip cluster locality with N cores is $\log_2$ (N) with each memory request. Requests would be tagged to indicate their origin, and then transmitted to the MNC. This approach may be used, for example, when simplicity is more important than overhead.

In a further embodiment, it is assumed that there will be N cores per K MNCs, and that these N cores will be clustered, as opposed to being in fully connected mesh. In this approach, the routing path is from the cluster through one or more caches (including any DDC) and then to the off-chip interconnect controller associated with that cluster. This interconnect may utilize a PCIe or another physical layer, for example. MNCs are each assigned a static system address partition. This may be done after boot configuration or system reset, to facilitate hot adding/removing/swapping of storage/memory. At the MNC, the system address ranges are further subdivided into pages which are either zero allocated (for initial allocation) or point to physical memory on some device. The advantage of this routing path is that the origin of the requests is implicit in the traffic source. For example, it is known which core cluster created the traffic implicitly, without further information or meta-data. Capturing and recording the originating core would otherwise require at least enough bits to encode the number of clusters within the node with each memory request. Using the locality information, the MNC network can migrate the virtual pages within the network, or check them out from the owner of the system address partition if the compute patterns warrant it.

Efficient use of this infrastructure is facilitated by software awareness. Given that the system address space is split between N MNCs, and these MNCs are connected to computing devices based on, for example, physical locality, tasks can be scheduled such that they are executed on computing devices connected to an MNC that controls the system and physical memory already allocated, or at least to a nearby MNC. This ensures low latency communications.

Figure 5:
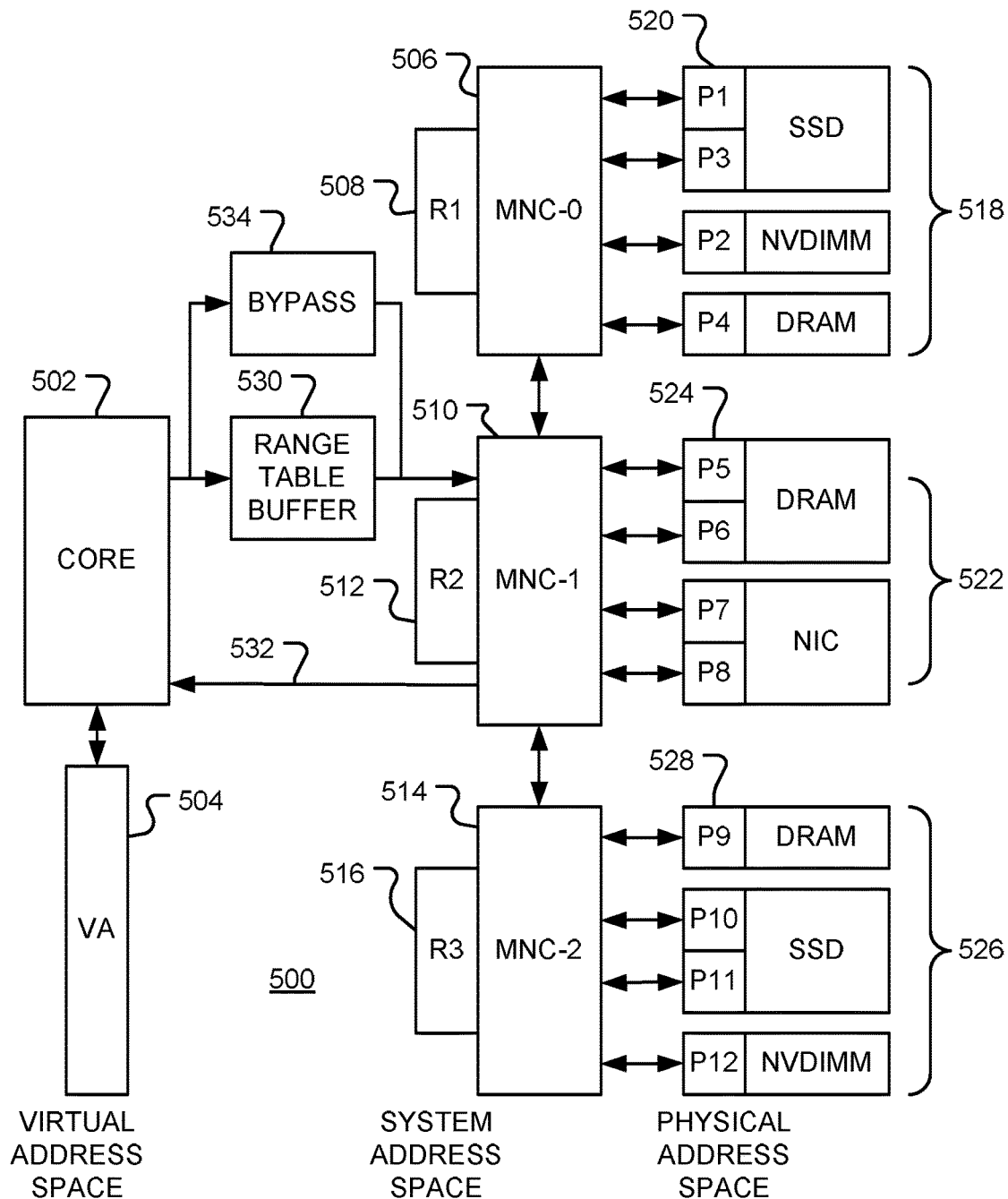
FIG. 5 is a block diagram of a data processing network, consistent with the disclosure.

FIG. 5 is a block diagram of a data processing network 500 consistent with the disclosure. Data processing network 500 includes a core or computing device 502 that operates in a virtual memory address space 504. In the embodiment shown, the system address space is divided into three partitions, R1, R2 and R3. System 500 also includes MNC 506 that is associated with system memory partition 508 (R1), MNC 510 that is associated with system memory partition 512 (R2), and MNC 514 that is associated with system memory partition 516 (R3). MNC 506 controls access to memory resources 518, that store pages 520 having physical addresses P1, P2, P3 and P4 in this example. MNC 506 translates a system address in the partition R1 to a physical address in the memory resources 518. Similarly, MNC 510 controls access to memory resources 522, that store pages 524 having physical addresses P5, P6, P7 and P8 in this example. MNC 510 translates a system address in the partition R2 to a physical address in the memory resources 522. MNC 514 controls access to memory resources 526, that store pages 528 having physical addresses P9, P10, P11 and P12 in this example. MNC 514 translates a system address in the partition R3 to a physical address in the memory resources 526. In this way, a 48K address space is split into four 16K partitions and each 16K partition is split into four 4K pages that are allocated between the physical resources.

When core 502 issues a request to access data at a virtual address space 504, the virtual address is translated to a system address in range table buffer (RTB) 530. If the address is not found in a local cache, the system address is passed to the MNC coupled to core 502. In this example, the system address is passed to MNC-1 (510). MNC-1 (510) determines if the system address is in the partition R2. If it is, the corresponding memory resource of 522 is identified together with the physical address in that memory resource, and data at the physical address is accessed. A memory write access may be acknowledged over link 532. Data read from the memory resource is returned over link 532. Bypass logic 534 may be provided to selectively bypass the RTB 530 when the address translation is such that a virtual memory address is equal to a corresponding system memory address. If the system address is not in the partition R2, the MNC that controls the partition is identified and the request is forwarded to the identified MNC where the request is serviced. Any response to a request is returned to the core 502 via link 532.

In certain embodiments, translation within the MNC between a system address and a physical address is made using a data structure stored in System to Physical Translation (STP) cache (230 in FIG. 2, for example). The data structure may be a table that uses a masking hash lookup of a page entry. For example, the page number may be computed with a logical AND operation between the system address and the page size as a power of two. An example page entry in the RTP cache may contain the information shown in TABLE 1.

TABLE 1

| system address base | device ID | physical or block start (depending on previous field) | Current Location/ MESI status |
| --- | --- | --- | --- |
| 0 | ssd_zero | 0xff, 0x10f | |

In one embodiment, three pointers are used to support copy on write, one to the entry which is the current clean physical copy (the head), one that is the parent and one that is the child. This enables the update process to be optimized. Other variations will apparent to those skilled in the art.

Memory allocation may be efficiently handled through use of a buddy memory allocation scheme or other scheme that may be represented by a sparse tree. Compaction of system address ranges (re-ordering) can be accomplished, for example, by signaling the OS to find the processing threads that contain a system address and then changing out the system address ranges. This process can be time consuming. However, for a large system address space (such as 64-bits) this is unlikely happen unless current systems become very much larger.

In one embodiment, the system is configured such that cores use a 64-bit address space, but the MNCs address a 128-bit system address space. This enables use of a prefix notation, for example, in the address space calculation from the MNC to address other nodes in the system.

Page information is stored in memory and may be cached locally to the MNC). In the simplest implementation of the hardware, an entry is used for each page. For example, if a single MNC is assigned a 100 TB address partition and if the page size is selected to be 2 MB, the table would fit into a small 64 MB SRAM structure even if the device was entirely full. Additional space is required if other metadata is to be stored. However, in one embodiment, the size of the table is reduced by compressing empty pages into a zero-page range. In another embodiment, the translation data may be persistent or have a second copy to ensure persistency.

Figure 6:
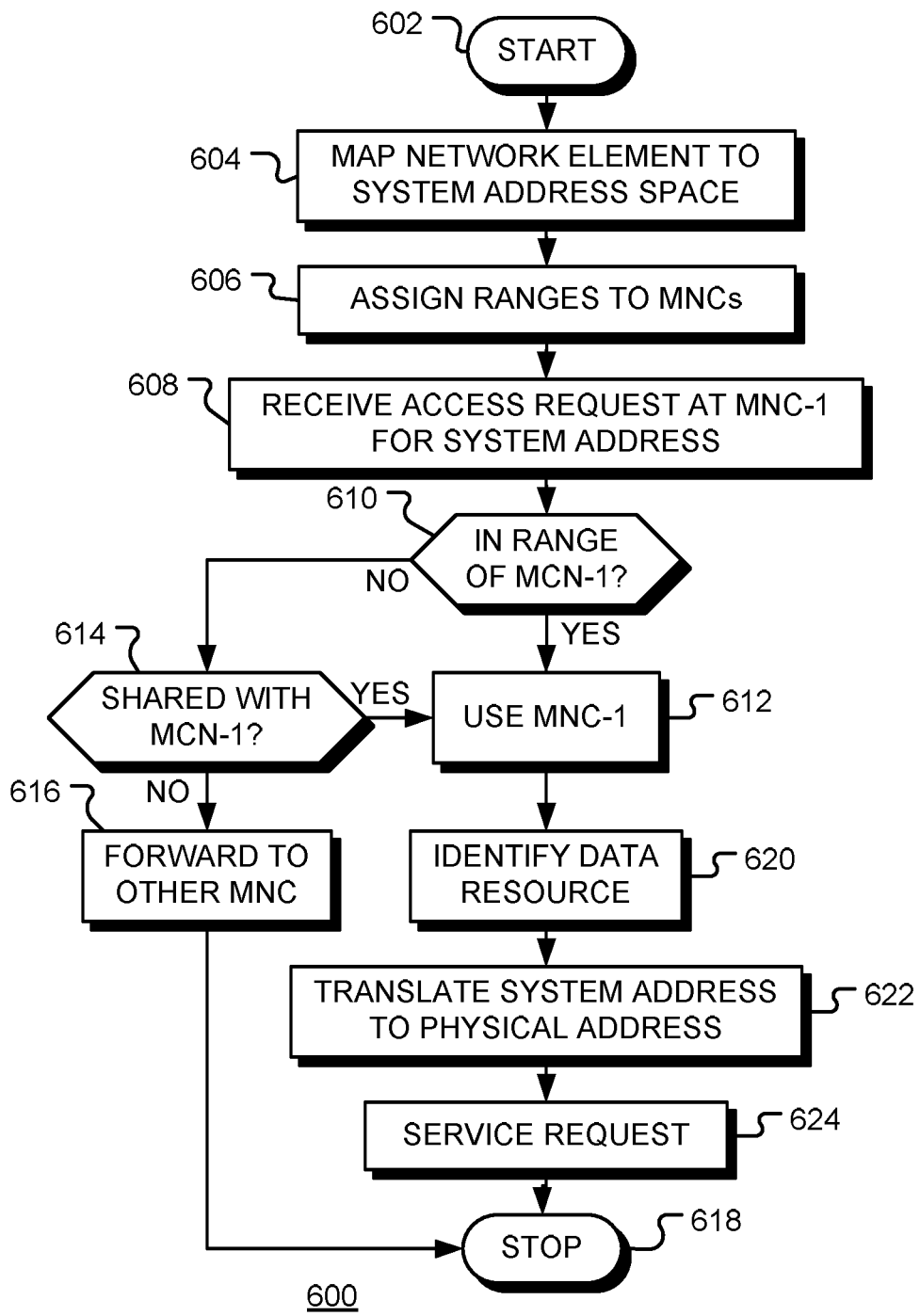
FIG. 6 is a flow chart of a method for routing memory access requests, consistent with embodiments of the disclosure.

FIG. 6 is a flow chart 600 of a method for accessing a one or more data resources by one or more computing devices in a data processing network routing memory access requests, consistent with embodiments of the disclosure. Following start block 602, elements of the data processing network are mapped to a system address space at block 604. At block 606, ranges or divisions of the system address space are assigned to memory node controllers of the data processing network. For example, a first partition may be assigned to first memory node controller, MNC-1, and a second partition assigned to a second memory node controller MNC-2. At block 608, a request is received at MNC-1 to access an element of the data processing network at a system address in the system address space. When the system address is in the partition of MNC-1, as depicted by the positive branch from decision block 610, MNC-1 is used to service the request at block 612. When the system address is not in the partition of MNC-1, as depicted by the negative branch from decision block 610, flow continues to decision block 614. If the system address is dynamically shared with the first memory node controller, as depicted by the positive branch from decision block 614, MNC-1 is again used to service the request at block 612. If the system address is not dynamically shared with the first memory node controller, as depicted by the negative branch from decision block 614, the request is forwarded to the MNC for the system address at block 616, where the request is serviced. The process terminates at block 618. MNC-1 services the request by identifying the appropriate data resource at block 620 and translating the system address to a physical address in the data resource at block 622. This may be done by accessing a table or directory, for example. Service of the request is completed at block 624 and the process terminates at block 618.

Some embodiments relate to a method for routing memory access requests, consistent with embodiments of the disclosure. The method has application to a clustered memory node controller scheme, as described above with reference to FIG. 3. In general, in a clustered scheme, there may be up to N cores or computing devices for each of K MNCs.

These N computer elements will be clustered so that the most optimal routing is to that local memory node. Memory requests to access a resource system address are received by a MNC. Each memory request originating from these cores goes directly to the closest MNC, so the request comes from core in the cluster of the local of the MNC. The channel to the appropriate data resource that holds the requested page is determined at block 620. If the request is to a page that is statically allocated to that MNC or to a page dynamically shared from another MNC then the request may immediately be returned to the core. However, if another MNC owns the memory (as determined by coherence protocol, for example), there is one additional network hop for the request before being fulfilled. When operation of the system is started, each MNC is assigned a division of the overall system addressable space available to the system (with provision for re-partitioning to facilitate hot-swapping). Each of the partitions assigned to each memory node is then broken into pages. The advantage of this system is that locality is implicit through the MNC from which a memory request originates. The computing device accessing the node is known (or at least the cluster accessing the nodes), without additional data. Using that information, the MNC can migrate the data pages within the memory network, or check them out from the owner of the partition if the compute patterns warrant it.

In some embodiments, the address range assigned to each MNC can serve as a scheduling function to direct the location (place of processing) execution based on the working sets of the function to be executed where the working sets are defined as the union of the sets formed by the range of data needed as input for some operation(s) and the range of data needed as an output from that function (and associated operation(s)).

In some embodiments, a range of virtual memory addresses and a copy of that range are mapped to the same first system address range in the data processing system until an address in the virtual memory address range, or its copy, is written to. The common system address range includes a number of divisions. Responsive to a write request to an address in a division of the common address range, a second system address range is generated. The second system address range is mapped to the same physical addresses as the first system address range, except that the division containing the address to be written to and its corresponding division in the second system address range are mapped to different physical addresses. First layer mapping data, for translating a virtual memory address to a system address, may be stored in a range table buffer and updated when the second system address range is generated. Second layer mapping data, for translating a system address to a physical address in a data resource, may be stored in a system-to-physical translation cache that is updated when shared data is modified. Thus, a two-layer, copy-on write mechanism is provided for a data processing system.

Figure 7:
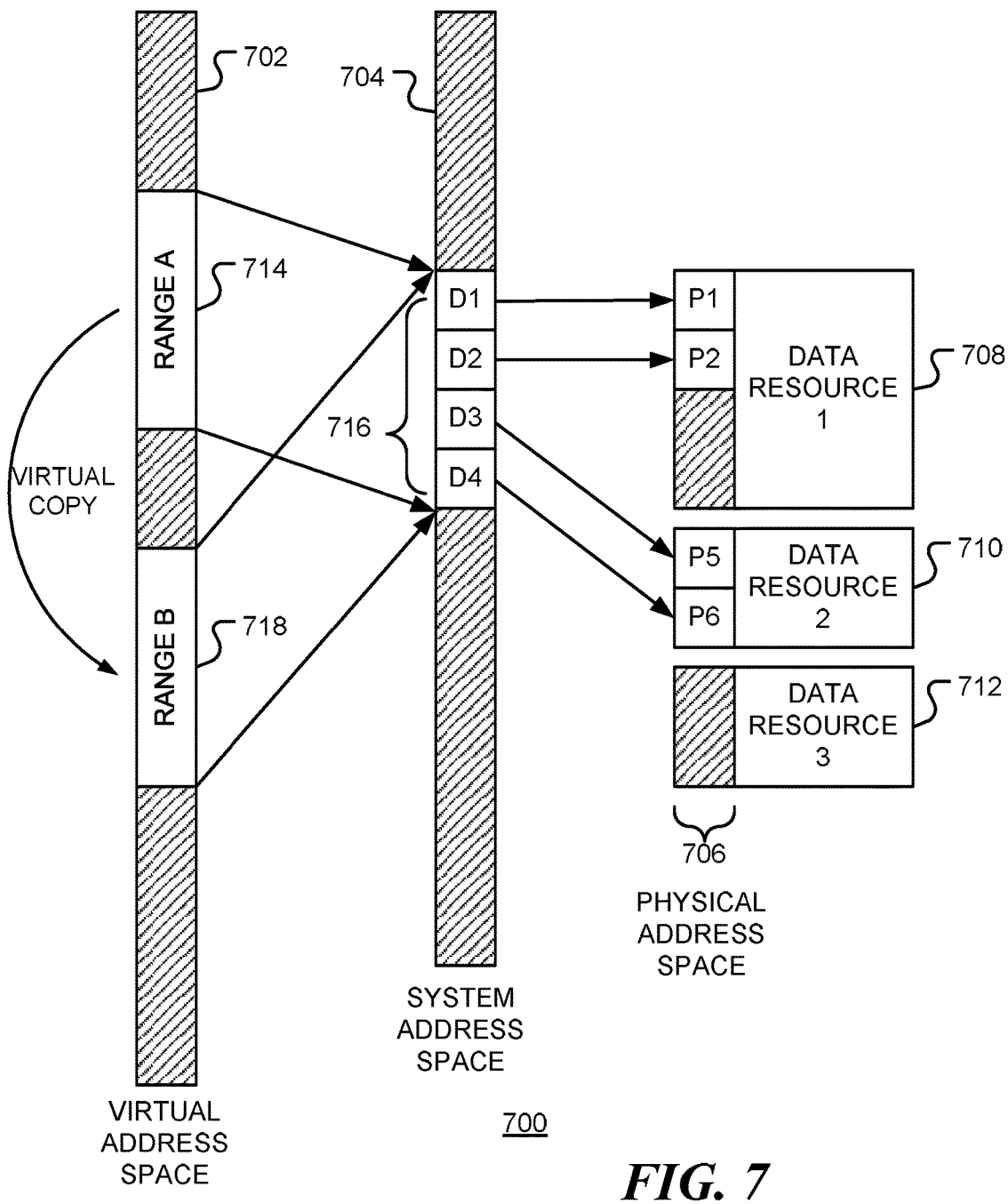
FIG. 7 illustrates a logical arrangement of memory in a data processing system, consistent with embodiments of the disclosure.

FIG. 7 illustrates a logical arrangement of memory 700 in a data processing system, consistent with embodiments of the disclosure. The memory arrangement includes a virtual memory address space 702. Although a single virtual memory address space 702 is shown in FIG. 7, each program or device sees its own virtual memory address space that contains instructions and data for use by that program or device. Programming threads may share the same virtual memory address space. The use of virtual memory addressing allows memory access to by controller by inhibiting one program from accessing or corrupting information used by another program. Memory arrangement 700 also includes a system address space 704. The system address space allows access to addressable units in the data processing system, such as memory, storage, hardware accelerators and network interface controllers. The system address space may contain both physical (memory backed) addresses and virtual memory addresses. Memory arrangement 700 also includes a physical address space 706 that contains physical addresses in data resources such a memory devices or storage devices, for example. Data resources 708, 710 and 712 are shown in FIG. 7, but a data processing system may have any number of data resources.

In accordance with embodiments of the disclosure, the one or more virtual memory address spaces are divided into address ranges, such as address range 714 (RANGE A), in FIG. 7. Each range may be defined by two parameters, such as start and end addresses, a start address and an extent (length), or offsets from a reference address, for example.

In accordance with embodiments of the disclosure, each range in the virtual memory address space is mapped to a corresponding range in the system address space. For example, virtual memory address range 714 is mapped to system address range 716. Each system address range is further divided into a number of divisions. In the example shown in FIG. 7, the system address range 716 has four divisions, denoted as D1, D2, D3 and D4. In the sequel, it is assumed that each division corresponds to a page of memory or storage, but other sized divisions may be used without departing from the present disclosure. The mapping is referred to as a first layer mapping and may be recorded and implemented using a range table buffer, for example.

Each division of a system address range is mapped to a page in a data resource. For example, division D1 is mapped to page P1 in data resource 708, division D4 is mapped to page P6 in data resource 710, etc. This mapping is referred to as a second layer mapping and may be recorded and implemented in a system-to-physical translation cache, for example.

When a process or thread requests a copy of virtual memory address range 714, a new virtual memory address range 718 (RANGE B) is created. Original virtual memory address range 714 is referred to as the 'parent' virtual memory address range, while the new virtual memory address range 718 is referred to as the 'child' memory address range. The child range may be in the same virtual memory space 702 or in a different virtual memory space. This operation is referred to as a virtual copy, since no data has been moved in any physical data resource. The child virtual memory address range 718 is mapped to the same system address range 716 as the parent virtual memory address range 714. However, a new mapping (from virtual memory address to system address) is generated for the child range. This is discussed in more detail below.

Operation may continue as long as no data is modified in range 714 or range 718. Thus, copying of the actual data is deferred. However, if data in range 714 or 718 is modified, by a write command for example, a physical copy of the modified data must be made since the data can no longer be shared.

Figure 8:
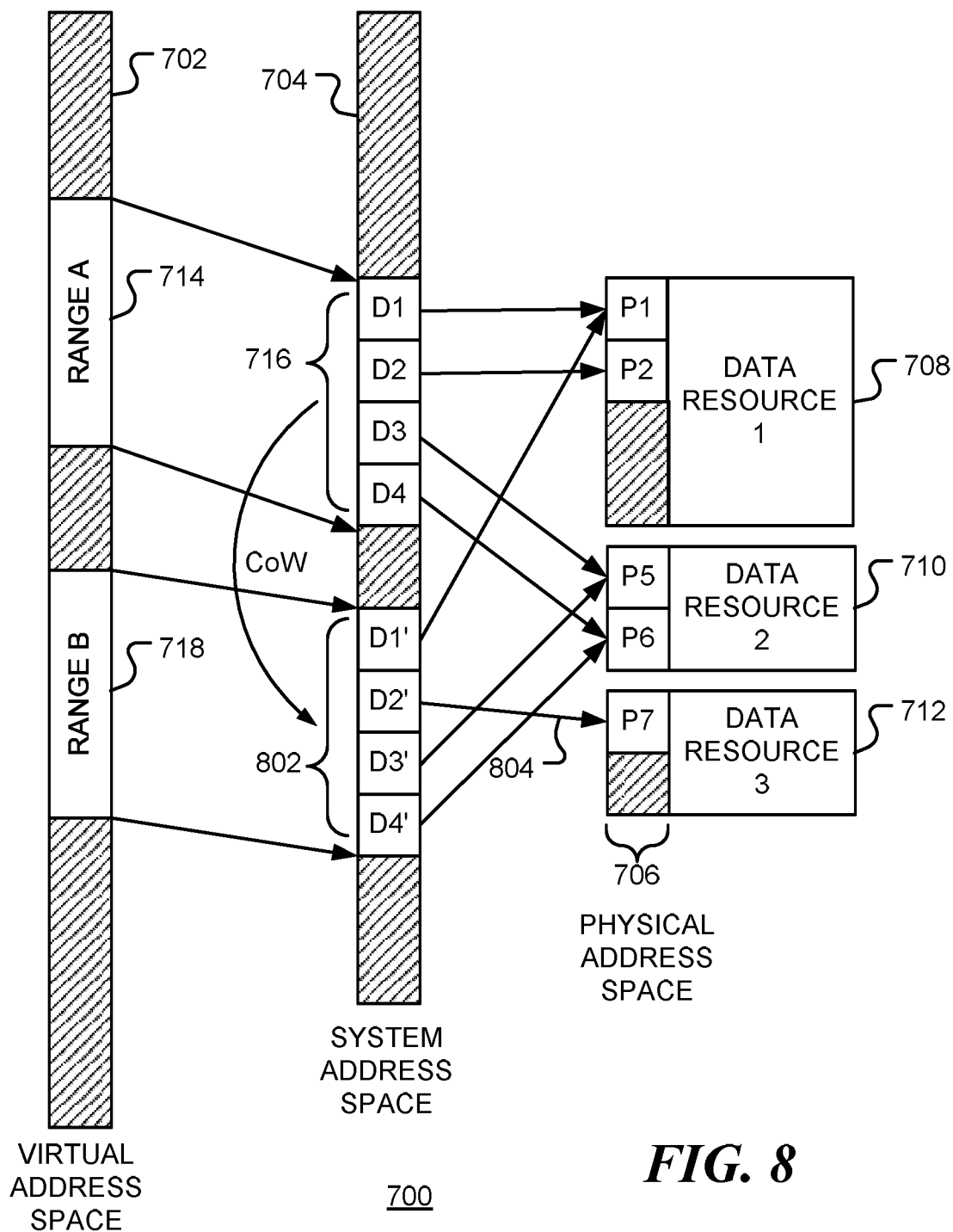
FIG. 8 shows a further logical arrangement of memory, after data in a range has been modified and a physical copy of the data has been made, consistent with embodiments of the disclosure.

FIG. 8 shows memory 700 after data in a range has been modified and a physical copy of the data has been made. In the example shown, it is assumed that a write request was issued for an address in child virtual memory address range 718 and that the address is mapped to division D2 of the system address range. After the write, parent range 714 and child range 718 cannot share division D2, so a two-layer copy is performed. Firstly, a copy 802 of the system address range 716 is made in the system address space 704, and the associated mapping from virtual memory address range 718 to system address range is updated. Copied system address range 802 has four divisions, denoted as Dr, D2', D3' and D4', which correspond to the divisions D1, D2, D3 and D4 in system address range 716. After the write (to either division D2 or D2'), data associated with divisions D2 and data associated with division D2' must be stored in different pages. In this example, D2 remains stored in page P2 of data resource 708, while data in the division D2' in the copied range 802 is to be stored in page P7 in data resource 712. A new mapping 804 is generated to indicate how system address range 802 is mapped to physical addresses. Alternatively, data in division D2' could remain stored in page P2 of data resource 708, while data in the division D2 in the original range 716 is stored in page P7 in data resource 712, since a computing device does not need knowledge of the second layer mapping.

In this manner, only a single additional page of physical storage is needed, rather than storage for the complete copied range 802.

An advantage of this approach is that copying of data is deferred until data is actually modified (and may be avoided all together is future accesses are 'read only'). A further advantage is that only modified divisions of the system address range are copied, rather than the complete range, thereby minimizing resource usage. The approach is termed a 'two-layer, copy-on-write' mechanism, since two separated mappings are maintained and updated (those mappings being the virtual to system address mapping defined by the range within the range table and the separate system address to physical page mapping within the memory node controller), and no physical data is copied until a write operation is requested.

In accordance with further aspects of the disclosure, mechanisms are provided for maintaining and updating the mapping from a virtual memory address space to a system address space and the mapping from a system address space to a physical address space. In one embodiment, the mechanisms are provided by a first memory address translation apparatus and a second memory address translation apparatus, respectively. The first address translation apparatus is accessible by one or more computing devices that use one or more virtual memory address spaces, and is configured to translate a virtual memory address in a first range of virtual memory addresses to a system address in a first range of system addresses. The second memory address translation apparatus includes data resource allocation circuitry to allocate resources of one or more data resources, and a system-to-physical address translation circuit, such as a cache, configured to translate a system address in the first range of system addresses to a physical address in the physical address space of a data resource of the one or more data resources. The data processing system is responsive to a copy request for a given virtual memory address in the first (parent) range of virtual memory addresses (714 in FIG. 7) to generate a second (child) range of virtual memory addresses (718 in FIG. 7). Subsequent to the copy request, but prior to a write operation in the parent or child range of virtual memory addresses, the first address translation apparatus is configured to translate both the parent and child ranges of virtual memory addresses to the same range of system addresses, 716.

Referring again to FIG. 8, after a virtual copy, the parent system address range 716 comprises parent divisions D1 . . . D4 and the child system address range 802 comprises corresponding child divisions D1' . . . D4'. Subsequent to a write operation to a system address in a first parent division, the second memory address translation apparatus is configured to allocate space in a data resource for storing a copy of data in the first parent division or the data to be written, update the system-to-physical address translation cache to include the child system address range, and update the system-to-physical address translation circuit cache to map either the first parent division or the corresponding second child division to the allocated space in the data resource. The system-to-physical address translation cache is updated to map the child divisions to the same physical addresses as the parent divisions, except that the first parent division and the corresponding child division are mapped to different physical addresses.

Figure 9:
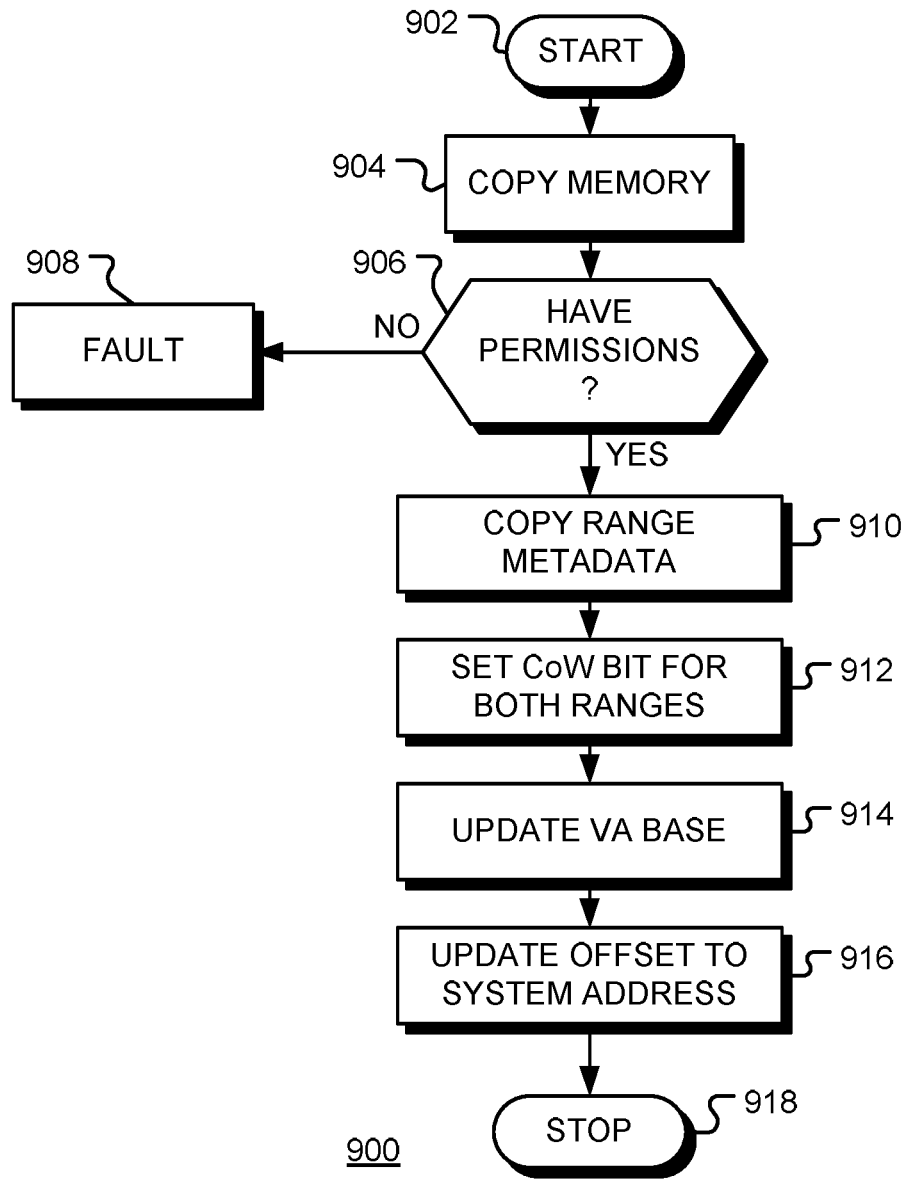
FIG. 9 is a flow chart of a method for performing a copy operation in a data processing system, consistent with embodiments of the disclosure.

FIG. 9 is a flow chart of a method 900 for performing a copy operation in a data processing system, consistent with embodiments of the disclosure. Following start block 902, an instruction to copy memory at a virtual memory address is issued by a device at block 904. The address is looked up in the range table of the device (the parent range table). If the table indicates that it is not permitted to copy the data at the address, as indicated by the negative branch from decision block 906, a fault condition is entered at block 908. If the copy is permitted, as indicated by the positive branch from decision block 906, the metadata for the address range that includes the virtual memory address to be copied is written as a new entry in the child range table at block 910. The child range table may be the parent range table itself or another range table, such as a range table of another device. After a copy, a CoW status indicator is set, at block 912, in entries in both the parent and child range tables (as shown in FIG. 10, discussed below) to indicate that the address range is part of a CoW operation and the data is currently in shared state. In the sequel, the CoW status indicator is referred to as a single CoW status bit, but other indicators may be used. The address ranges may have any size, and can be extremely large, but at some granularity. At block 914, the metadata in the child range table is modified to indicate a new range of virtual memory addresses. For example, the virtual memory address range may be indicated by a base address and an extent or a start address and an end address. At block 916, the metadata in the child range table is modified, if necessary, to indicate that the new range of virtual memory addresses corresponds to the same range of system addresses as the original virtual memory address range. Thus, both the original (parent) and copied (child) virtual memory addresses correspond to the same system range and the same physical memory locations, so the process is referred to as a virtual copy. The virtual copy is now complete, as indicated by termination block 918. It is noted the order of operations may be changed, and that multiple operations may be combined into a single operation. It is also noted that no physical memory has been updated.

The first memory translation apparatus may include at least one range table buffer to store translation data in one or more entries. The data stored in an entry are indicative of address range boundary values defining a range of virtual memory addresses between respective virtual memory address boundaries in a virtual memory address space, a translation between a virtual memory address in the range of virtual memory addresses and a corresponding system address in a system address space and a copy-on-write status.

FIG. 10 illustrates range table entries in two-layer copy-on-write mechanism, consistent with embodiments of the disclosure. Parent range table entries 1000 show the contents of a single range table entry in parent range table A at different times. In the embodiment shown, the address range boundary values in parent range table entry 1000 include a virtual memory address base value 1002 (VA_BASE) and a virtual address extent 1004, (VA_EXTENT). These indicate an address range from VA_BASE to VA_BASE+VA_EXTENT. Field 1006 contains an offset that, when added to a virtual memory address, indicates the system address corresponding to the virtual memory address. Thus, the offset value is used to translate a virtual memory address to a system address. The range table entry 1000 also includes a permissions field 1008, which may contain memory access permission, a CoW field 1010, or other administrative data (such as forward and backward pointers to parent and child CoW ranges in the system address space as an optimization for locating the parent and child ranges or criticality bits for error protection, data could also indicate a range devoid of writes which when read returns zero without accessing memory system past the RTB).

Before any copy takes place, the corresponding entry 1012 in the child range table (table A-COPY) is empty. The entry contains fields 1014, 1016, 1018, 1020 and 1022 that correspond with fields 1002, 1004, 1006, 1008 and 1010, respectively, of the entry in the parent range table A.

When a copy instruction is issued, the parent entry 1000 is copied into the child entry 1012 at COPY STEP 1. At COPY STEP 2, the CoW field is set in field 1010 of entry 1000 and in field 1022 in entry 1012 to indicate that the corresponding data is shared between two virtual memory address ranges. This is denoted as 'C' in fields 1010 and 1022. At COPY STEP 3, a new virtual address base (NEW VA_BASE) is written to field 1014 in entry 1012 and a new offset is written to field 1018. The new virtual address base and new offset are related such that the new virtual address range maps to the same system address range as before, so data is shared between the original virtual address range and the new virtual address range.

The shared state condition can be set until interrupted by a write to either the parent or the child virtual memory address range. When that happens, the range that made the write initiates a HW-driven clone operation (through the memory storm interface). This clone operation takes in the base system address and range (all available to the hardware) and returns a new system address and range. In the case that the data was written by the device using the child range, the offset value in field 1018 is updated to reflect the new system range, as depicted in the WRITE STEP 1 in FIG. 10. If the data was written to the device using the parent range table, the field 1006 would be updated instead of the field 1018.

In WRITE STEP 2, after the write, both the parent and child ranges' CoW status indicators are changed to indicate non-CoW, i.e. that the corresponding data is not shared (in one embodiment a range entry can be linked via pointers in the range's administrative data to quickly identify the pointed-to CoW range's parent and child if present). Any further CoW behavior is transparently handled within the memory node controller (MNC) itself.

In the first layer copy-on-write, the new system range is generated. In the second layer copy-on-write, a new mapping from system to physical addresses is generated, but only the written-to physical pages are actually copied. The remaining pages still map to the physical pages of the parent range (until they too written to). As discussed above, each system range is subdivided into physical pages whose metadata (such as actual location, empty/allocated, etc.) is represented within an efficient data structure. The data structure may be a B-Tree or other self-balancing search tree, for example. Upon receiving a copy operation, a new set of pages is set up so that they initially point to the parent range's pages. Upon receiving a write (to a system address), the page that it falls into is calculated (e.g., using a hash), and the page is checked to see if it has a CoW status bit set (within the hardware data structure mapping physical pages, again, e.g., a B-Tree). If the CoW status bit is set, the write is buffered, then a new physical page is allocated (on one of the available memory technologies, such as DRAM/NV/SSD/etc.) and the page is copied. Once copied the buffered write is committed to the copied page. Optionally, the metadata for the page may be copied.

Read accesses to memory are often more frequent than write accesses. Therefore, keeping the initial step on the core itself (for example by copying the range table entry and setting a bit) significantly speeds up the critical path of the copy or clone operation. Moving the actual physical copying of memory to the memory fabric enables the OS and core to continue computing, moving the slow write operation off the critical path. Another significant advantage of this mechanism is that it enables accelerators to use the same CoW mechanism. This is not possible with prior systems. An accelerator can have a cloned memory range passed to it and, transparently, the memory fabric can utilize the second level of CoW to write to distinct pages from the parent range, thus reducing copy overhead and data movement.

A parent range, such as range A (714) in FIG. 7, may have multiple child ranges, such as range B (718) in FIG. 7). The parent being the only range that is mapped to physical memory. In one embodiment, when a write occurs to the parent range, the write is buffered and one of child ranges is mapped to physical memory. This child range becomes the parent range for the other child ranges. One implementation uses three pointers to make this process efficient: a head pointer, a parent pointer and a child pointer.

On write to the parent range, a physical page is created for the first child (copied from the parent). The head pointer is then set to 0, the parent pointer is set to 0, and head/parent pointers are reset for the other child ranges. Having both head and parent pointers provides a single indirection if a child page is referenced (for example, when there are multiple CoW segments all pointing to the same parent page). That is, the head pointer enables the actual physical page to be identified directly. In contrast, with just parent and child pointers, as in a linked list, the latency grows linearly with the number of children. The parent pointer is used when a write occurs to a child page to indicate what physical memory is to be copied. Upon a write to a child, the child is updated, the page is copied from the parent and the pointers are updated.

Figure 11:
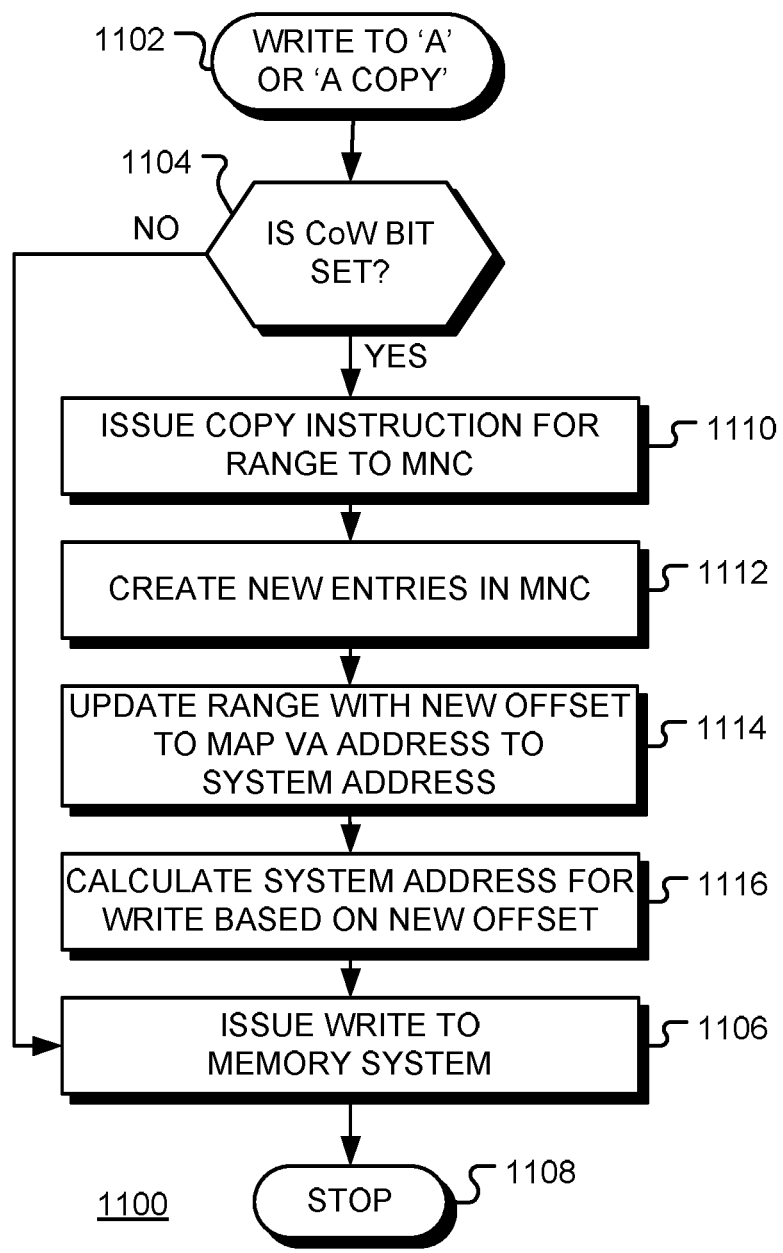
FIG. 11 is a flow chart of a method for handling a write operation in data processing system.

FIG. 11 is a flow chart of a method 1100 for handling a write operation in data processing system. Following a write instruction to a virtual memory address at start block 1102, the address is looked up in the range table to determine if the CoW status bit in the corresponding entry is set. If the CoW status bit is not set, as depicted by the negative branch from decision block 1104, the memory is not shared, so the write instruction is issued to the memory system at block 1106 and the process terminates at block 1108. However, if the CoW status bit is set in the range table entry, as depicted by the positive branch from decision block 1104, a copy request is issued, at block 1110, to the memory node controller (MNC) associated with the range containing the system address to be written. At block 1112, the MNC creates a new system range and updates its system-to-physical translation table to map the new system range to physical addresses. The MNC also allocates new physical storage and copies, to the allocated storage, the division or page that containing the address to be written to. At block 1114, the offset and virtual memory address base are updated in the range table of the device that issued the write request and the CoW status bit is cleared. At block 1116, the virtual memory address to be written is translated to a system address using the new offset in the range table. Finally, a corresponding write instruction is issued to the memory system at block 1106.

Inside the MNC, the page to which the write is directed is calculated, the page is then allocated new physical memory, and copied. This operation may be performed at the memory controller level off-chip, and can take advantage of in-technology copy techniques such as buffer-buffer copy and in-SSD copy, for example. Once copied, the write is submitted to the new page. All the other pages still point to the parent pages as they are "clean" and exactly the same as the parent pages. In this way the second layer of copy-on-write provides the same or better performance than a standard copy-on-write system given that the main processing core does not have direct participation. At this point the two layer "fast" copy-on-write process is complete and the process terminates at block 1108.

Instruction Set Architecture (ISA) Commands

An embodiment of the memory system may include ISA commands selected from the following list of commands. Alternatively, the actions could be actuated by bus signals from a core.

fetch address, range (bytes)
store address, value
prefetch address, range, type
allocate—instruction allocates size bytes returns a pointer as a system address to the allocated memory. NOTE: user space allocate functions can still trap to privileged kernel mode for ulimit permissions check by OS layer if required.
command: alloc <r1><size in bytes><flags>
address given in <r1> can be used as a suggested placement (needed for certain applications), if an address is given in the instruction call then it is assumed to be required. If placement cannot be fulfilled then allocation fails, <r1> set to zero. normal allocation path memory storm sets <r1> to system address allocated with number of requested bytes if allocation succeeds, otherwise returns null via <r1> mapping into virtual address space of process handled by the core, either in hardware using a mechanism within the range table buffer or by a software slab allocator which sets the offset to map a cores virtual address to the system address returned by this command.
flags can be used to specify modifications or characteristics such as
eager vs. zero page allocate on touch
persistence (zero through four scale, four meaning persistence required, zero meaning none required), this is necessary to adequately virtualize file system behavior for legacy operating systems.
latency (zero through four scale, zero meaning not important, four meaning very important)
bandwidth (zero through four scale, zero meaning not important, four meaning very important)
zero memory (single bit) zero all memory allocated.
r/w (two bits, none/r/w/r+w)—can be set by any resource but still useful especially for optimizing page placement of the pages
enable accelerator usage (enable the memory storm fabric to optimize memory for quick passage to an accelerator, and exceptions to OS handler core if accelerators try to grab memory ranges that aren't tagged as accessible).
flag as shared (system address range will then be reference counted for use with deallocate cmd).
to be used as file (enforces range invalidate for currently stored range).

memcpy—instruction copies n bytes from memory area src <r1> to memory area dst <r2>, with flags for CoW copy vs. eager copy.
 command: memcpy <src—r1><dst—r2><flags>
 address given by r2 must have been allocated via allocate instruction above
 address at r2 must be of same length or greater than r1
 source and destination addresses are assumed not to overlap, if they do a flag must be toggled to indicate memmove like behavior is needed.
 default behavior is to lazily copy into r2, only adding pointers within the hash map structure to reference data in the parent range of r1. If writes are received to either address range <r1> or <r2>, the CoW behavior dictates a copy of that physical page, unless pages in the memory address specified by r2 have been eagerly allocated (see allocate instruction).
 if an eager flag is given, data is copied immediately from the source address range in <r1> to the destination address range <r2>.
 upon completion an ack signal is returned to the core via the communications bus between MNC and cores.
clone—copies context
 instruction is a cooperative effort between the core range table buffer and the memory node controller.
deallocate—frees memory space pointed to by the system address provided, if system address range has been marked as shared when allocating or with madvise command, this call is treated as an "unlink" call where memory will not be deallocated until all page references pointing to it have been deallocated themselves. This command acts on both the core components and the memory storm network, as actions must be taken for the range and the pages in the memory network (although they can occur asynchronously).
 command: dealloc <sys_address—r1><range—r2>
reallocate—resize allocation from system address with new range
 command: realloc <sys_address><new size in bytes>
 Initial system address will be replaced by new system address if a contiguous block can't be allocated (just as in current reallocate software schemes). If at all possible, however, the address will remain the same just with a longer range specified by the second parameter.
 If realloc fails, <sys_address> is set to zero (NULL) which indicates an error condition, the memory specified by the original system address is unmodified and still valid.
madvise—set memory characteristics of an already allocated system address range or subrange).
 command: madvise <sys_address—r1><range in bytes—r2><flags—r3>
 flags <r3> can be used to specify modifications or characteristics such as
  eager vs. zero page allocate on touch
  persistence (zero through four scale, four meaning persistence required, zero meaning none required), this is necessary to adequately virtualize file system behavior for legacy operating systems.
  latency (zero through four scale, zero meaning not important, four meaning very important)
  bandwidth (zero through four scale, zero meaning not important, four meaning very important)
  zero memory (single bit) zero all memory allocated.
  r/w (two bits, none/r/w/r+w)—can be set by any resource but still useful especially for optimizing page placement of said pages
  enable accelerator usage (enable the memory storm fabric to optimize memory for quick passage to an accelerator, and exceptions to OS handler core if accelerators try to grab memory ranges that aren't tagged as accessible).
  flag as shared (system address range will then be reference counted for use with deallocate command).
  flag as being used by a file (so hardware may be notified that system address range need be range flushed).
 on error the sys_address register is set to zero (NULL)
 similar to LINUX 'madvise' command
mclear—set range to zero page (no writes needed, simply point to zero page in hash map). This command is designed to simplify construction of virtual machines with emulated paging.
 command: mclear <sys_address—r1>
 r1 must be the start of the range
mflush—flush a range to a persistent storage, doesn't mean there can't be a memory cached copy in volatile storage, however this is quite useful for things that need intermittent persistence consistency. NOTE: there can also be variant maintenance commands that set a node/system flush interval for all ranges marked as "persistent." A variant of the 'madvise' instruction above could implement a variadic version of this that would enable the MNC to perform an 'mflush' instruction on a range independent of further external commands (emulating in hardware what many OS(s) do today). Designs could implement system wide or per range flush intervals that wouldn't have to manually use this flush command.
 command: mflush <sys_address—r1>
 Initialize Shared memory—set a system address range to be marked as shared so that software implementers can implement abstractions like shared memory (shm_open/etc.).
 command: initshared <sys_address—r1><range—r2><flags—r2>
 Open Shared Memory—Open a system address range as a shared segment of some already allocate range, can have a set or subset of a segment. A reference count may be maintained for shared pages so that they are not automatically deallocated when one thread deallocates the memory.
 command: openshared <sys_address+offset—r1><range—r2><flags—r3>
 increment shared memory system address (handle) for pages within MNC
 return sys_address to core, core maps sys_address in to calling process's virtual address space with the permissions specified by the flags. In this way a local open shared segment can have differing permissions for a sub-range of some larger memory segment (e.g., shared library mapping).
 Unlink Shared Memory—release a shared memory, must be called by the mapper of the shared memory (caller of initshared), otherwise deallocate is expected which removes virtual address space range translation and itself decrements shared counters within the shared system address range.
 command: unlinkshared <sys_address—r1>
 decrements shared memory handle system address (handle) for pages within MNC
 sem_barrier_setup—set up the barrier at the system address given with the current starting value
 command: sem_barrier_setup <sys_address—r1><value—r2>
 sem_barrier_wait—decrement barrier at the system address (requests are atomic, so behavior is as expected)
 command: sem_barrier_wait <sys_address—r1> sem_barrier_release—invalidate the barrier if we need to zero it
   command: sem_barrier_release <sys_address—r1 >
   mwait—set a signal on a single address or range of addresses.
   command: mwait <sys_address start—r1><range r2 >

The allocate process is transparent to user-facing programs and maintains the same user-facing API. However, modification of systems software layers may be required.

In a first embodiment, the allocation process begins with a user 'malloc' instruction handled by a standard allocator in the operating system or a standard library (such as libc), which will give out a range to the process/thread via a user-space allocator from ranges allocated as slabs by the standard allocator itself. Memory can be mapped from these slabs into a process' virtual address space by core level allocate commands. Alternatively, the mapping may be performed via software intervention that fills the range table for that process from the present slab of memory. In this approach, a global slap of memory is maintained.

In a second embodiment, instead of maintaining a global slab, a slab is allocated per process when the virtual memory space is created. Memory is allocated from this local slab (local to each process) as needed, based on the needs of the process (e.g., allocate from this slab on a per process basis, in a distributed manner). In this process, the standard allocator is modified to hand out local slabs. This approach is more distributed than the first approach may be configured to be compatible with POSIX/SUS standards.

In a third embodiment, each user-space allocate call uses the allocate commands of the memory system directly. These commands may be ISA commands as described above. In this approach, checks on user limits (ulimits) are optional and may be implement or by-passed as desired.

For all allocation processes, at the start of the initial allocation, system memory may or may not have been allocated. However, entries within a data structure inside the memory node controller (MNC) are created or modified to indicate that the system address ranges are valid as they are requested. When reading from memory initially (i.e. the first read), the values will appear as zero. On first write, physical memory is allocated by the memory node controller. Thus, the allocation of physical memory is performed in 'lazy' manner. For a particular address space identifier (ASID), all memory is "zero" allocated. When, on initial allocation within the MNC, the MNC knows which lazily allocated page is fresh (non-CoW) and can zero it at the device itself rather than bringing into the core to set as zero. A range coherence modification ensures no non-zero cache lines for the allocated real addresses exist within the coherence network. In a further embodiment, the entire range is marked as a zero range, enabling reads to that range to be returned simply as zero without going external at all. Once a write occurs, it can be carried out at the page level through the dynamic data cache (DDC) and MNC. Once a zero page is checked into the DDC it can be entered into the tag index array and marked as zero (no memory allocated). Read requests hitting on that page will be immediately returned as a zero read. A bus optimization may be used to indicate zero data without sending a full 64B flit through the cache coherent network. Once a write occurs, the actual physical memory is allocated. Conversely if the page isn't in the DDC, the MNC will respond in kind with a zero return for reads until that page (or another sub range) is written to.

The memory system typically allocates slabs of system memory, out of which the runtime/OS can further allocate ranges. An allocate instruction initiates the process of interacting with the memory system and sends a request to the memory network. The request may be sent to the default, closest, or selected MNC. The request is processed by a memory node controller that, in parallel sends the system address back to the core in response and sets up the system-to-physical address translation circuit of the memory node controller. This may entail modifying or creating an entry in hash map or updating a sparse tree. The physical address is an address in memory managed by the MNC and may not be selected until a first write command is received. Once the address is returned to the core, the range table buffer entry is updated so that the user-facing pointer maps into the requesting process's space via a base. The base address and current pointer may be combined to map back into the system address space, as described above. When the range table buffer entry synchronizes with the memory backed range table, the entry is written in persistent form. The range could be further subdivided by software, hardware, or via further calls to initiate usage of shared memory.

The system address selection within the MNC is done via standard algorithm either implemented in hardware/firmware/microcode. An example implementation would be using the Fast Buddy Allocation Algorithm, where address ranges can consist of a subset of a single MNC's range or multiple MNCs that, if needed, can be utilized cooperatively.

Figure 12:
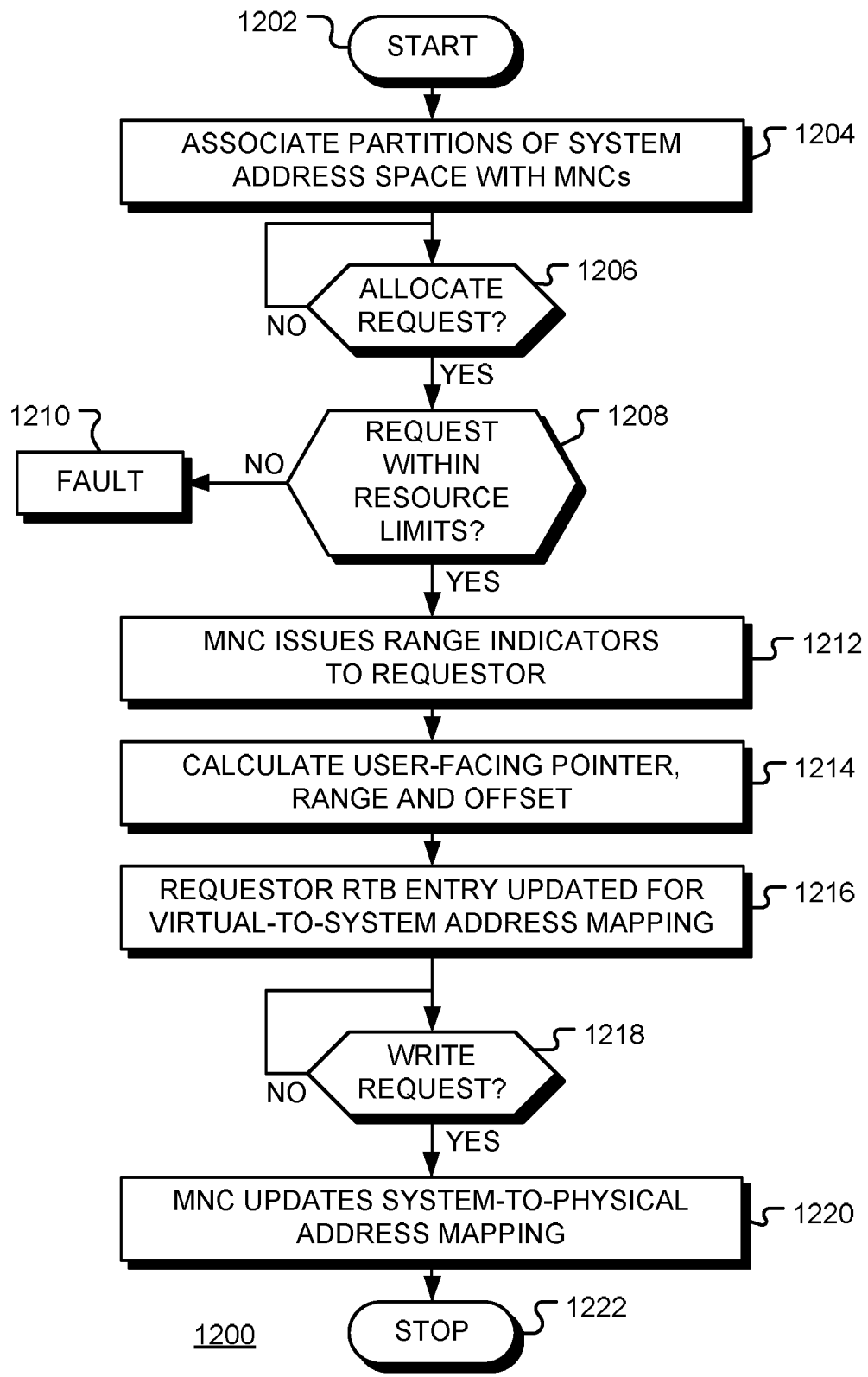
FIG. 12 is a flow chart of a method for allocating memory, consistent with embodiments of the disclosure.

FIG. 12 is a flow chart 1200 of a method for allocating memory, consistent with embodiments of the disclosure. As described above, the 'allocate' instruction or command allocates a specified number of bytes returns a pointer as a system address to the allocated memory. Referring to FIG. 12, following start block 1202, partitions of the system address space are assigned to memory node controllers at block 1204. Each memory node controller manages the mapping between system addresses and physical addresses in data resources. When a user request to allocate N-bytes is received, as depicted by the positive branch from decision block 1206, the request may be checked at decision block 1208. Here, a user is a process or thread executing on a core of a computing device. The request may be an ISA instruction passed to the memory system hardware, for example. Optionally, at decision block 1208, the instruction is trapped by the operating system (OS), and a check is performed to determine if the requested memory size is within resource limits assigned to the process or thread. For example, the instruction may be trapped to privileged kernel mode for a user limit (ulimit) permissions check by the operation system layer. If the request is not within designated resource limits, as depicted by the negative branch from decision block 1208, a fault is declared at block 1210 and the method terminates. If the request is within resource limits, as depicted by the positive branch from decision block 1208, the request passes to the memory node controller. When the allocate instruction includes a suggested placement, the request will also fail if the placement cannot be fulfilled. At block 1212, indicators of a system address range are returned to the requesting core. The indicators may be selected from a start address, an offset, an extent or size and an end address. For example, a start address and an extent may be returned. At block 1214, mapping parameters calculated to map a virtual memory range to the new system range. For example, a user-facing pointer, range and offset may be calculated. This calculation may be done by the core either in hardware, using a mechanism within the range table buffer, or by a software block allocator that sets the offset to map a core's virtual address to the system address returned by the request. The user-facing pointer is returned to the user (the process or thread that requested the allocation). At block 1216, the requestor RTB entry is updated for the virtual-to-system address mapping. At this point, the virtual-to-system address mapping has been set, but the system-to-physical address mapping may not have been set. However, when the user first writes to the allocated memory, as depicted by the positive branch from decision block 1218, the memory mode controller (MNC) updates the system-to-physical address mapping at block 1220. When data is written to a virtual address, the virtual address is translated to a system address by the range table buffer, an instruction is sent to the MNC, the MNC converts the system address to a physical address and an instruction is sent to a corresponding data resource. The method terminates at block 1222.

Figure 13:
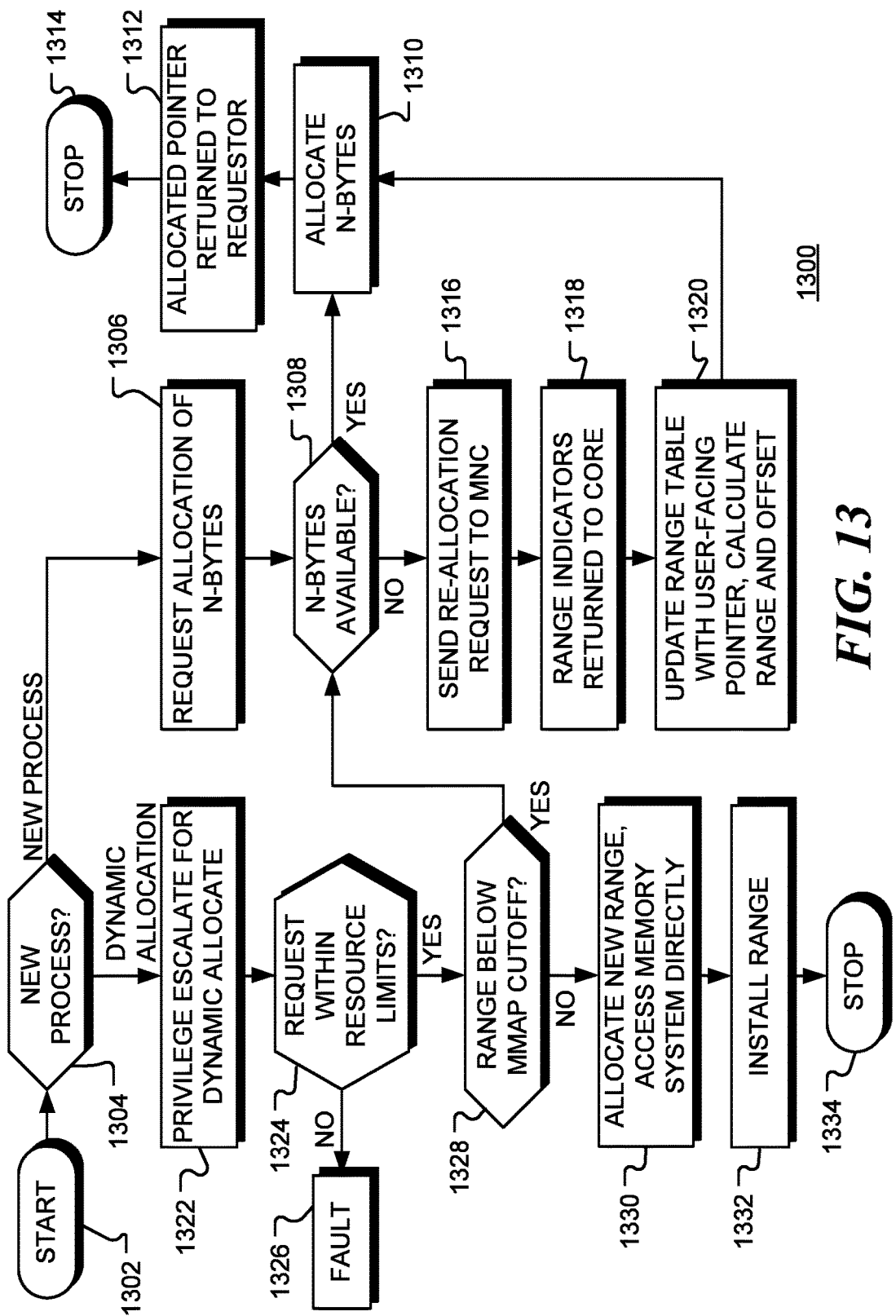
FIG. 13 is a flow chart of a further method for allocating memory, consistent with embodiments of the disclosure.

FIG. 13 is a flow chart 1300 of a further method for allocating memory, consistent with embodiments of the disclosure. Following start block 1302, the flow depends on whether memory is to be allocated in response to the creation of a new process or thread, or in response to a request for dynamic memory allocation. If the allocation is in response to process or thread creation, as depicted by 'new process' branch from decision block 1304, a request for allocation of N-bytes of memory is made at block 1306. The response is first received by a standard allocator, such the operating system. If N-bytes of memory are available in a slab of valid system addresses, as depicted by the positive branch from decision block 1308, the memory is allocated at block 1310, the allocated pointer is returned to the requestor, via the stack for example, at block 1312 and the method terminates at block 1314. If N-bytes of memory are not available, as depicted by the negative branch from decision block 1308, a re-allocation request is sent to a memory node controller of the memory system at block 1316. For example, when contiguous block can't be allocated, the initial system address will be replaced by new system address. When possible, however, the address will remain the same and the length or extent of the range increased.

The memory node controller creates a new or extended range of valid system addresses and returns indicators of the range to the requesting core at block 1318. In a further embodiment, the indicators may be returned to an operating system or other memory allocator. At block 1320, the range table is updated to map a virtual address range to the system address range. For example, the range table may be updated with the user-facing pointer and the calculated range and offset. At this point, a new, valid, range of system addresses has been created. Flow then continues to block 1310, where N-bytes from the range are allocated by a standard allocator, such as the OS. The method terminates at block 1314.

A similar method is followed in response to a request for dynamic memory allocation, as depicted by 'dynamic allocation' branch from decision block 1304. Following a request from a user (a process or thread), the privilege level of the user is escalated (if required) at block 1322 to permit memory allocation. Optionally, at decision block 1324, a check is made to determine if the size of requested memory allocation is within the resource limits assigned to the user. If not, as depicted by the negative branch from decision block 1324, a fault is declared at block 1326 and no memory is allocated. If the size of the requested data is within the assigned resource limits, as depicted by the positive branch from decision block 1324, flow continues to decision block 1328. If the range from which the memory is to be allocated is not below the memory map (MMAP) cutoff, as depicted by the negative branch from decision block 1328, a new range is allocated at block 1330 and the memory system is accessed directly. The new range is installed by the MNC at block 1332 by updating data structures in MNC. The mapping to physical memory may be updated at the same time or deferred until a first write to the range. The requested memory is allocated from the new or modified system range. The method terminates at block 1334. If the range is below the MMAP cutoff, as depicted by the positive branch from decision block 1328, flow continues to decision block 1308 and the allocation proceeds as described above.

The MNC can allocate memory from another memory node controller's system address space to use within its system address translation tables, redirecting one system address to another system address. For example, for a defragmentation operation, a first MNC could allocate memory in the system address space partition of a second MNC where the first MNC would show these pages as checked out from the second MNC in the first MNC. The first MNC would keep the physical memory backing of the pages as they were originally. Once the address range allocated from the second MNC is entered in the appropriate tables, the offsets within the range table entries may be changed to point to the new system address range. At this point the system address range that was previously used is now free. The new system address range from the second MNC and the plurality of pages making up that address range are now free to migrate independently according to the coherence protocol, meta-data, or scheduling algorithm.

The system may be equipped with a system cache structure, known as a data delivery cache (DDC).

In one implementation, the data delivery cache (DDC) is an on-package cache that enables the memory node controller (MNC) to place pages (or other sub-ranges) closer to where they will be needed. Decisions can be made across a much wider range with more data as to which blocks of data go there, implementing a more efficient global data placement on the memory fabric. The content delivery network also serves as a filter for the system-to-physical address space translation mechanism so that the fraction of addresses needing system-to-physical translation are negligible compared to virtual to physical address translation. The DDC is a feedforward-cache, in that data is pushed into the cache. In contrast, conventional caches are demand driven and data is pulled in the cache as needed.

The data delivery cache (DDC) is a block of memory that can be accessed via the system address space. In front of the DDC is a controller mechanism that enables indexing into the DDC's local memory banks. This controller also contains a local map that maps the current system addressed content to the DDC's independent physical memory.

The data delivery cache is filled by "pushing" of data (one page at a time, for example) from one or more MNC's to one or more data delivery caches. This is quite distinct from conventional caching mechanisms that rely on local pull mechanisms. The push mechanism is synchronized with the MNC to ensure consistent temporal state transfer.

The DDC can have pages in three states:

Exclusive (E)—meaning this page is checked out from the MNC and no other DDC contains this page. This enables the page to be updated efficiently without coherence between other DDCs in the system nor having to continually refresh the MNC with the latest values.

Modified (M)—meaning that this DDC has the only copy and at least some of the page has been modified.

Shared (S)—meaning that this page is shared (and therefor read-only), among multiple DDCs to provide maximum bandwidth to all cores on the system.

A potential concern of this method would be that multiple MNCs could be pushing this page to multiple DDCs in the shared state at the same time. For example, the page could be in the shared state and checked out from the home MNC to multiple foreign MNCs. Given the chosen routing option for data requests (all requests go directly to one MNC per cluster), the duplicate requests will be intercepted and handled correctly before they ever get to the core. This enables multiple cores to access the exact same real address from any number of DDCs or MNCs simultaneously. This scheme could also be used to implement coherence zones where ranges or pages of data are accessed non-coherently and safely, assuming the pages are in a known 'shared' or 'exclusive' state with respect to the zone.

When evicted, a page could exist in one of two states. If it is in the shared state 'S', the MNC simply signals to invalidate the page tag index within the controller's 'valid' table. If the DDC page is in the modified 'M' state, the MNC begins queuing requests for that page, sends a request to the DDC to write the page back and the DDC stops responding to requests for that page. The MNC then writes that page to some memory region within its physical space (either memory or storage). The DDC returns the last request that was responded to as part of the metadata returned, after which the MNC responds to all outstanding requests.

In operation, access to a first virtual address is requested by a computing device of a data processing network. The first virtual address to a first system address in the system address space and a request to access the first system address is transmitted to a memory node controller of the data processing network and to a data delivery cache of the data processing system. When a copy of data at the first system address is stored in the data delivery cache, the data delivery cache to accessed. Otherwise, when a copy of data at the first system address is not stored in the data delivery cache, the memory node controller translates the first system address to a first physical address in data resource of the data processing system and accesses the data resource of the data processing system at the first physical address.

The memory node controller may monitor accesses to a block of physical memory and determine, based on a cost function, when the block of physical memory is frequently used. The memory node controller pushes frequently used data from the block of physical memory to the data delivery cache. Data in the data delivery cache may be indexed by system address tags, so that no translation from system address to physical address is required. Alternatively, the DDC may translate from system address to a physical address in the cache.

The memory node controller queues, in a first queue, access requests received while it is pushing data from the block of physical memory to the data delivery cache and forwards the queued access requests to the data delivery cache once all data from the block of physical memory has been pushed to the data delivery cache. The data delivery cache queues, in a second queue, access requests received after all data from the block of physical memory has been pushed to the data delivery cache, merges requests in the first and second queues. The data delivery cache then services requests in the merged first and second queues.

Figure 14:
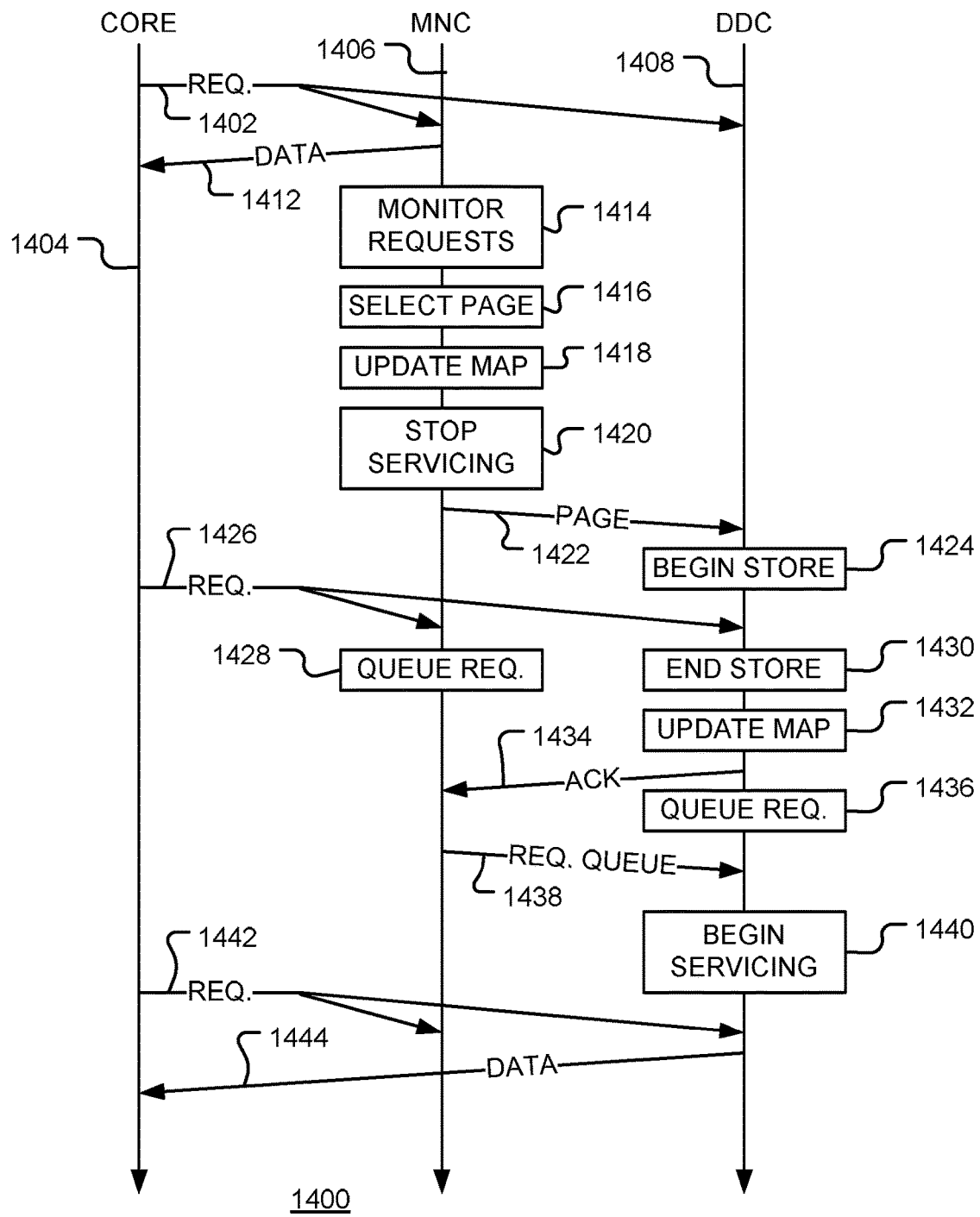
FIG. 14 is a flow chart of a further method for allocating memory, consistent with embodiments of the disclosure.

FIG. 14 is a signal flow chart 1400 illustrating use of a data delivery cache (DDC) in accordance with an embodiment of the disclosure. In the example shown, a system memory request 1402 is sent from a processing core (with timeline 1404) to an MNC (with timeline 1406) and the a DDC (with timeline 1408). In one embodiment, requests from a processing core for data at system addresses are sent to the MNC and to the DDC in parallel so as to minimize the latency of fulfillment.

If the requested line is present in the MNC, the request is serviced by the MNC in data signal 1412. Alternatively, if the MNC has registered the page containing the line as present in the DDC, that line would have been serviced from the DDC and ignored from the MNC.

Requests are monitored by the MNC at 1414. A decision on which data is to be pushed from MNC controlled memory to the DDC may be based on some cost function. Various cost functions will be apparent to those of ordinary skill in the art, such as the frequent reuse of a page versus streaming, clock, MRU, latency or Quality of Service (QoS). If, based on the cost function, it is predicted that performance would be improved if a page (or other size block of data) were in available in the DDC, the page is selected at 1416.

To ensure consistent data, data access requests are not processed during the transfer period. In one implementation, the MNC updates its mapping from system address to physical memory address at 1418 to indicate that the physical page corresponding to a system address is checked out to the DDC. At 1420, the MNC stops serving requests for pages checked out to the DDC.

Starting at 1422, the selected page is pushed to the DDC. A buffering mechanism may be used during transfer of data from the MNC to the DDC and during transfer from the DDC back to the MNC. In contrast, a conventional cache pulls data from memory. The DDC's memory contains a buffer that is capable of buffering at least a portion of the data sent so that in the event that a page must be evicted, the DDC can evict the page and install the new page on command. At 1424. the DDC begins storing the data in the physical memory of the DDC as it is transferred.

While data is being transferred, a request 1426 for a line at a system address may be sent in parallel to the MCN and the DDC. The MNC consults its mapping and sees that corresponding page is checked out to the DCC, so the MNC does not service the request. The DDC also determines that it does not have the requested data and ignores the request.

Request 1426 may be ignored by the MNC, in which case the request should be resent after the transfer is complete, or requests may be queued.

In an embodiment of the queuing approach, the MNC begins queuing requests when data transfer begins. For example, request 1426 is queued at 1428.

Once the data transfer is complete at 1430, the page is installed in the DDC. The range of system addresses associated with the data is also sent to the DDC and a mapping between system addresses and physical addresses in the DDC memory is updated at 1432.

The DDC then sends acknowledgment ('ack') 1434 to the MNC. Until this time, the MNC continues queuing data requests at 1428. Once the 'ack' 1434 is received, the page is considered to be 'checked out' to the DDC.

In parallel with the 'ack' 1434 from the DDC, the DDC controller begins queuing requests at 1436. On receiving the 'ack', the MNC forwards all outstanding requests from the point that the MNC decided to push the page to the DDC (together with an acknowledgement) to the DDC in signal 1438. If requests are not queued, signal 1438 may be an acknowledgement. The number of outstanding requests may be limited by the fill buffers, so only a limited amount of data needs to be forwarded to the DDC. The MNC request queue and the DDC request are merged and the DDC beings servicing requests at 1440. In one example embodiment the DDC first sorts the outstanding requests from the MNC and those queued up within the DDC (a discrete maximum number, say 20, of outstanding addresses) using a merge sort. The merge sort may be implemented in hardware for a fixed number of addresses. Once this sort is done, the DDC feeds the head of the buffer into a DDC request buffer. When the head of each buffer is the same, one is discarded so that duplicate memory requests are quashed.

When a further request 1442 for a line at a system address in sent from the processing core to the MNC and the DDC, the MNC determines that the corresponding page has been checked out to the DDC and ignores the request. The DDC translates the system address to a physical address in its own memory and returns the requested data in signal 1444. The DDC continues to service requests for this data until the line is evicted from the DDC memory, at which time a message is sent from the DDC to the MNC to inform it of the evicted and, if necessary to transfer the evicted line back to the MNC controlled memory. During this transfer, the request queuing process described above may be used, with the roles of the MNC and DDC reversed.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

One or more memory node controllers may be implemented in an integrated circuit. The circuit may be defined be a set of instructions of a Hardware Description Language (HDL), which may be stored in a non-transient computer readable medium, for example. The instructions may be distributed via the computer readable medium or via other means such as a wired or wireless network. The instructions may be used to control manufacture or design of the integrated circuit, and may be combined with other instructions.

Embodiments of the memory system may maintain use of a virtual memory system. This may be done, for example, when backwards compatibility is desired. However, this is not necessary since there is a direct mapping between the virtual and system address spaces. The range tables are introduced to enable a quick translation between from virtual to system addresses. The ranges tables enable implementation of POSIX instructions such as 'Copy-on-Write' and 'Clone'. However, range tables are not required and the system address space is accessed directly in some embodiments.

The translation from the system address space to the physical pages devices understood by devices, is achieved by the Memory Node Controller. The introduction of the system address space enables the Memory Node Controller to seamlessly handle the storage devices without need of updating traditional structures such as translation look-aside buffers (TLBs) all the way to the core. Given that the system to physical mapping is performed by the Memory Node Controller, the MNC can update its own entries without interrupting application execution on the critical path. From a software perspective, more specifically, virtualization, it is possible to allocate sub-chunks of the system address space of the parent (such as a virtual machine hypervisor) to the child (such as a virtual machine guest). These entries can be obtained by a small addition/subtraction from the parent range and live as standalone range table entries. This technology enables any level of nested application to have its own range table entries in the compute device's range table, as such removing the overhead of nested virtualization when translation from a virtual memory space (virtualized or not, irrespective of memory spaces are nested) to the system address space. The memory system also enables a fully-virtualized system address space. This is a hardware-driven address space layout randomization, a feature currently handled in software by the operating system. This adds to the level of device security and prevents unauthorized memory accesses. The mechanism entails that accesses to range tables can themselves be virtualized. As they are rarely written, much like page tables (since the MNC handles memory paging), the range tables as viewed from within a context reveal nothing about the actual system address mapping. However, from a parent range's perspective (transitively), they see an address, but again it is only relative to their own base, which is again unknown. Following this logic to the end, and also considering the MNC behavior, it becomes clear that the MNC has the capability of virtualizing the entire system address by itself, allowing arbitrary rearrangements, i.e. for defragmentation. It also makes clear that system addresses are really just allocations in concept, lazy in a similar way to current virtual memory overcommit schemes. Finally, applying this scheme to its logical end, range tables never need be walked, as they actually always hold the correct value, and the MNC can maintain the offset to present the range table view to guests. In normal operation (doing translations), it does nothing. In addition, the MNC can easily know what ranges are themselves range tables, further lending support to the possibility of this scheme.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A data processing network, comprising: a network of devices addressable via a system address space, the network of devices comprising a computing device configured to execute an application in a virtual address space; a virtual-to-system address translation circuit coupled to the computing device and configured to translate a virtual address in the virtual address space to a system address in the system address space; and a memory node controller comprising: a first interface to a data resource, the data resource addressable via a physical address space; a second interface to the computing device; and a system-to-physical address translation circuit, configured to translate a system address in the system address space to a corresponding physical address in the physical address space of the data resource.

2. The data processing network of item 1, further comprising a memory, where the virtual-to-system address translation circuit is configured to access a virtual-to-system address mapping stored in the memory.

3. The data processing network of item 2, where the system address space comprises a plurality of ranges, each range having an offset address, where the virtual-to-system mapping comprises a range table, and where the virtual-to-system address translation circuit comprises a range table buffer configured to access the range table and retrieve a range table entry comprising an offset address of a range together with a corresponding virtual address base and an indicator of an extent of the range.

4. The data processing network of item 3, further comprising allocation circuitry responsive to a memory allocation request from the computing device to provide an offset address to the virtual-to-system address translation circuit, where range table is updated dependent upon the offset address.

5. The data processing network of item 1, further comprising: a physical device configuration setup (PDCS) memory that stores information indicative of a mapping of the devices of the data processing network into the system address space.

6. The data processing network of item 1, further comprising a data delivery cache (DDC), where system memory requests are sent simultaneously to the DDC and the MNC, where a system memory request is service by the DDC when the requested data has been pushed to the DDC by the MNC, and where the system memory request is serviced by the MNC otherwise.

7. A method of memory access comprising: requesting access to a first virtual address by a computing device of a data processing network, where devices of the data processing network are addressable in system address space; translating the first virtual address to a first system address in the system address space; transmitting a request to access the first system address to a memory node controller of the data processing network; translating, by the memory node controller, the first system address to a first physical address in data resource of the data processing system; and accessing the data resource of the data processing system at the first physical address.

8. The method of item 7, where: the first virtual address is a base address of a range of virtual addresses; the first system address is an offset in a range of system addresses; and translating the first virtual address to the first system address in the system address space comprises accessing a range table to determine a mapping between the range of virtual addresses and the range of system addresses and applying the mapping to the first virtual address.

9. The method of item 8, further comprising: assigning the range of system addresses and updating the range table responsive to a memory allocation request by the computing device.

10. The method of item 8, where translating, by the memory node controller, the first system address to the first physical address comprises accessing a system address translation table stored in a memory, the method further comprising updating the system address translation table responsive to a first write by the computing device to an address in the first system address range.

11. A method for allocating memory to a computing device in a data processing network, the method comprising: providing an indicator of a range of system addresses in a system address space to the computing device; updating a virtual-to-system address mapping to map a range of virtual addresses in a virtual address space of the computing device to the indicated range of system addresses; and updating a system-to-physical address mapping to map a system address in the indicated range of system addresses to a physical address in a storage device, where the data processing network comprises a plurality of devices addressable in the system address space.

12. The method of item 11, where updating a system-to-physical address mapping to map the system address in the indicated range of system addresses to the physical address in a storage device is only performed after the computing device first writes to the system address.

13. The method of item 11, where providing the indicator to the range of system addresses in the system address space to the computing device is performed in response to a memory allocation request from a process or thread executed on the computing device.

14. The method of item 13, where providing the indicator of the range of system addresses in the system address space to the computing device is performed by an operating system of the data processing network and is contingent upon a size of the requested memory.

15. The method of item 13, where the indicated range of system addresses is selected from a global pool of system addresses by an operating system of the data processing network.

16. The method of item 13, where the indicated range of system addresses is selected from a pool of system addresses assigned to the process or thread executed on the computing device.

17. The method of item 13, where the indicated range of system addresses is selected from system addresses assigned to a memory node controller of the data processing network.

18. The method of item 11, where updating the virtual-to-system address mapping to map the range of virtual addresses to the indicated range of system addresses comprises updating an entry in a range table stored in a memory of the data processing network.

19. A method of memory access comprising: requesting access to a first virtual address by a computing device of a data processing network, where devices of the data processing network are addressable in system address space; translating the first virtual address to a first system address in the system address space; transmitting a request to access the first system address to a memory node controller of the data processing network and to a data delivery cache of the data processing system; when a copy of data at the first system address is stored in the data delivery cache, accessing the data delivery cache to access a copy of data the first physical address, and when a copy of data at the first system address is not stored in the data delivery cache: translating, by the memory node controller, the first system address to a first physical address in data resource of the data processing system; and accessing the data resource of the data processing system at the first physical address.

20. The method of item 19, further comprising: monitoring, by the memory node controller, accesses to a block of physical memory; determining, based on a cost function, when the block of physical memory is frequently used; and the memory node controller pushing data from the block of physical memory to the data delivery cache.

21. The method of item 20, further comprising: the memory node controlling queuing, in a first queue, access requests received while it is pushing data from the block of physical memory to the data delivery cache; the memory node controller forwarding the queued access requests to the data delivery cache once all data from the block of physical memory has been pushed to the data delivery cache; the data delivery cache queuing, in a second queue, access requests received after all data from the block of physical memory has been pushed to the data delivery cache; the data delivery cache merging requests in the first and second queues; and the data delivery cache servicing requests in the merged first and second queues.

What is claimed is:

1. A data processing network, comprising:
a network of devices addressable via a system address space, the network of devices comprising a computing device configured to execute an application in a virtual address space;
a virtual-to-system address translation circuit coupled to the computing device and configured to translate a virtual address in the virtual address space to a system address in the system address space; and
a memory node controller comprising:
a first interface to a data resource, the data resource addressable via a physical address space;
a second interface to the computing device; and
a system-to-physical address translation circuit, configured to translate a system address in the system address space to a corresponding physical address in the physical address space of the data resource.

2. The data processing network of claim 1, further comprising a memory, where the virtual-to-system address translation circuit is configured to access a virtual-to-system address mapping stored in the memory.

3. The data processing network of claim 2,
where the system address space comprises a plurality of ranges, each range having an offset address,
where the virtual-to-system mapping comprises a range table, and
where the virtual-to-system address translation circuit comprises a range table buffer configured to access the range table and retrieve a range table entry comprising an offset address of a range together with a corresponding virtual address base and an indicator of an extent of the range.

4. The data processing network of claim 3, further comprising allocation circuitry responsive to a memory allocation request from the computing device to provide an offset address to the virtual-to-system address translation circuit, where the range table is updated dependent upon the offset address.

5. The data processing network of claim 1, further comprising:
a physical device configuration setup (PDCS) memory that stores information indicative of a mapping of the devices of the data processing network into the system address space.

6. The data processing network of claim 1, further comprising a data delivery cache (DDC), where system memory requests are sent simultaneously to the DDC and the MNC, where a system memory request is serviced by the DDC when the requested data has been pushed to the DDC by the MNC, and where the system memory request is serviced by the MNC otherwise.

7. A method of memory access comprising:
requesting access to a first virtual address by a computing device of a data processing network, where devices of the data processing network are addressable in system address space;
translating the first virtual address to a first system address in the system address space;
transmitting a request to access the first system address to a memory node controller of the data processing network;
translating, by the memory node controller, the first system address to a first physical address in a data resource of the data processing system; and
accessing the data resource of the data processing system at the first physical address.

8. The method of claim 7, where:
the first virtual address is a base address of a range of virtual addresses;
the first system address is an offset in a range of system addresses; and
translating the first virtual address to the first system address in the system address space comprises accessing a range table to determine a mapping between the range of virtual addresses and the range of system addresses and applying the mapping to the first virtual address.

9. The method of claim 8, further comprising:
assigning the range of system addresses and updating the range table responsive to a memory allocation request by the computing device.

10. The method of claim 8, where translating, by the memory node controller, the first system address to the first physical address comprises accessing a system address translation table stored in a memory, the method further comprising updating the system address translation table responsive to a first write by the computing device to an address in the first system address range.

11. A method for allocating memory to a computing device in a data processing network, the method comprising:
providing an indicator of a range of system addresses in a system address space to the computing device;
updating a virtual-to-system address mapping to map a range of virtual addresses in a virtual address space of the computing device to the indicated range of system addresses; and updating a system-to-physical address mapping to map a system address in the indicated range of system addresses to a physical address in a storage device, where the data processing network comprises a plurality of devices addressable in the system address space.

12. The method of claim 11, where updating a system-to-physical address mapping to map the system address in the indicated range of system addresses to the physical address in a storage device is only performed after the computing device first writes to the system address.

13. The method of claim 11, where providing the indicator to the range of system addresses in the system address space to the computing device is performed in response to a memory allocation request from a process or thread executed on the computing device.

14. The method of claim 13, where providing the indicator of the range of system addresses in the system address space to the computing device is performed by an operating system of the data processing network and is contingent upon a size of the requested memory.

15. The method of claim 13, where the indicated range of system addresses is selected from a global pool of system addresses by an operating system of the data processing network.

16. The method of claim 13, where the indicated range of system addresses is selected from a pool of system addresses assigned to the process or thread executed on the computing device.

17. The method of claim 13, where the indicated range of system addresses is selected from system addresses assigned to a memory node controller of the data processing network.

18. The method of claim 11, where updating the virtual-to-system address mapping to map the range of virtual addresses to the indicated range of system addresses comprises updating an entry in a range table stored in a memory of the data processing network.

19. A method of memory access comprising:
requesting access to a first virtual address by a computing device of a data processing network, where devices of the data processing network are addressable in system address space;
translating the first virtual address to a first system address in the system address space;
transmitting a request to access the first system address to a memory node controller of the data processing network and to a data delivery cache of the data processing system;
when a copy of data at the first system address is stored in the data delivery cache, accessing the data delivery cache to access a copy of data at a first physical address, and
when a copy of data at the first system address is not stored in the data delivery cache:
translating, by the memory node controller, the first system address to the first physical address in data resource of the data processing system; and
accessing the data resource of the data processing system at the first physical address.

20. The method of claim 19, further comprising:
monitoring, by the memory node controller, accesses to a block of physical memory;
determining, based on a cost function, when the block of physical memory is frequently used; and
the memory node controller pushing data from the block of physical memory to the data delivery cache.

21. The method of claim 20, further comprising:
the memory node controlling queuing, in a first queue, access requests received while it is pushing data from the block of physical memory to the data delivery cache;
the memory node controller forwarding the queued access requests to the data delivery cache once all data from the block of physical memory has been pushed to the data delivery cache;
the data delivery cache queuing, in a second queue, access requests received after all data from the block of physical memory has been pushed to the data delivery cache;
the data delivery cache merging requests in the first and second queues; and
the data delivery cache servicing requests in the merged first and second queues.

* * * * *